(12) United States Patent
Ko et al.

(10) Patent No.: US 11,481,125 B2
(45) Date of Patent: Oct. 25, 2022

(54) STORAGE DEVICE AND STORAGE SYSTEM PERFORMING OFFLOADED TASKS FROM HOST

(71) Applicant: SAMSUNG ELECTRONICS CO., LTD., Suwon-si (KR)

(72) Inventors: Yohan Ko, Suwon-si (KR); Dong-Uk Kim, Seoul (KR); Insoon Jo, Hwaseong-si (KR); Jooyoung Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/019,429

(22) Filed: Sep. 14, 2020

(65) Prior Publication Data

US 2021/0232330 A1 Jul. 29, 2021

(30) Foreign Application Priority Data

Jan. 23, 2020 (KR) ........................ 10-2020-0009124

(51) Int. Cl.
*G06F 3/06* (2006.01)

(52) U.S. Cl.
CPC .......... *G06F 3/0631* (2013.01); *G06F 3/0604* (2013.01); *G06F 3/0689* (2013.01)

(58) Field of Classification Search
CPC ..... G06F 3/0631; G06F 3/0689; G06F 3/0604
See application file for complete search history.

(56) References Cited

U.S. PATENT DOCUMENTS

| 8,756,371 | B2 | 6/2014 | Hall et al. | |
| 8,959,420 | B1 | 2/2015 | Piszczek et al. | |
| 9,639,457 | B1 | 5/2017 | Piszczek et al. | |
| 10,185,655 | B2 | 1/2019 | Stalzer | |
| 2005/0210188 | A1* | 9/2005 | Mizuno ................ | G06F 3/0689 711/112 |
| 2016/0085445 | A1* | 3/2016 | Lee ....................... | G06F 3/0611 711/103 |
| 2017/0091127 | A1* | 3/2017 | Khan ................... | G06F 13/4068 |
| 2018/0356992 | A1* | 12/2018 | Lamberts ............. | G06F 3/0685 |
| 2019/0155777 | A1 | 5/2019 | Shim | |
| 2019/0243791 | A1 | 8/2019 | Osqueizadeh | |
| 2019/0272215 | A1 | 9/2019 | Olarig et al. | |
| 2021/0081121 | A1* | 3/2021 | Curewitz ............. | G06F 12/0873 |

* cited by examiner

*Primary Examiner* — Masud K Khan
(74) *Attorney, Agent, or Firm* — Sughrue Mion, PLLC

(57) ABSTRACT

A storage device includes a first interface, an operation circuit, and a nonvolatile memory. The first interface receives a first data chunk from a host device. The operation circuit generates first processed data by processing the first data chunk and generates a first signal indicating a size of the first processed data. The nonvolatile memory stores the first processed data in a storage location, when the storage location at which the first processed data are to be stored is designated to the storage device based on the first signal. The first interface outputs the first signal to the host device.

19 Claims, 18 Drawing Sheets

STORAGE DEVICE AND STORAGE SYSTEM PERFORMING OFFLOADED TASKS FROM HOST

CROSS-REFERENCE TO RELATED APPLICATIONS

This application claims priority under 35 U.S.C. § 119 to Korean Patent Application No. 10-2020-0009124 filed on Jan. 23, 2020, in the Korean Intellectual Property Office, the disclosure of which is incorporated by reference herein in its entirety.

BACKGROUND

1. Field

The present disclosure relates to a storage device, and more particularly, to a storage device and a storage system for performing offloaded work from a host.

2. Description of Related Art

Nowadays, various types of electronic devices are being used. An electronic device performs unique functions depending on operations of electronic circuits included therein. The electronic device may perform a unique function while operating solely within itself. In some cases, the electronic device may perform a unique function while communicating with various other electronic devices.

A storage device is an example of an electronic device. The storage device may store and output data depending on operations of components included therein, thus providing a user with a storage service. The storage device may manage data solely within itself or may manage data while communicating with various other electronic devices.

A host device may be an electronic device that provides a service to the user by communicating with the storage device. The host device may provide the storage device with data to be stored therein. Also, the host device may manage data to be stored in the storage device.

As a variety of information is distributed and the amount of data increases sharply, a plurality of storage devices may be included in a single system. In this case, the host device may manage data to be stored in the plurality of storage devices. In the case where the host device processes and manages data to be stored in the plurality of storage devices, the workload of the host device may become severe.

SUMMARY

It is an aspect to provide a storage device and a storage system for performing offloaded work from a host.

According to an aspect of an exemplary embodiment, there is provided a storage device comprising a first interface configured to receive a first data chunk from a host device; an operation circuit configured to generate first processed data by processing the first data chunk and to generate a first signal indicating a size of the first processed data; and a nonvolatile memory configured to store the first processed data in a storage location, when the storage location at which the first processed data are to be stored is designated to the storage device based on the first signal, wherein the first interface outputs the first signal to the host device.

According to another aspect of an exemplary embodiment, there is provided a storage system comprising a first storage device configured to receive a first data chunk from a host device, to convert the first data chunk into first data, and to output a first signal indicating a size of the first data to the host device; and a second storage device configured to receive a second signal from the host device after the first signal is output, wherein, when the second signal indicates the second storage device as a generation location at which a parity for recovering the first data is to be generated, the second storage device receives the first data from the first storage device and generates the parity based on the first data.

According to another aspect of an exemplary embodiment, there is provided a storage system comprising a first storage device configured to receive a first data chunk from a host device and to generate first processed data by processing the first data chunk; and a second storage device configured to receive a first parity chunk for recovering the first data chunk and to generate a first processed parity data by processing the first parity chunk, wherein the first storage device includes a first memory configured to store the first processed data in a first size unit, and wherein a size of the first processed data is an integer multiple of the first size unit.

BRIEF DESCRIPTION OF THE FIGURES

The above and other aspects will become apparent by describing in detail exemplary embodiments thereof with reference to the accompanying drawings, in which.

DETAILED DESCRIPTION

Below, various embodiments will be described in detail and clearly to such an extent that an ordinary one in the art may easily implement the embodiments.

Figure 1:
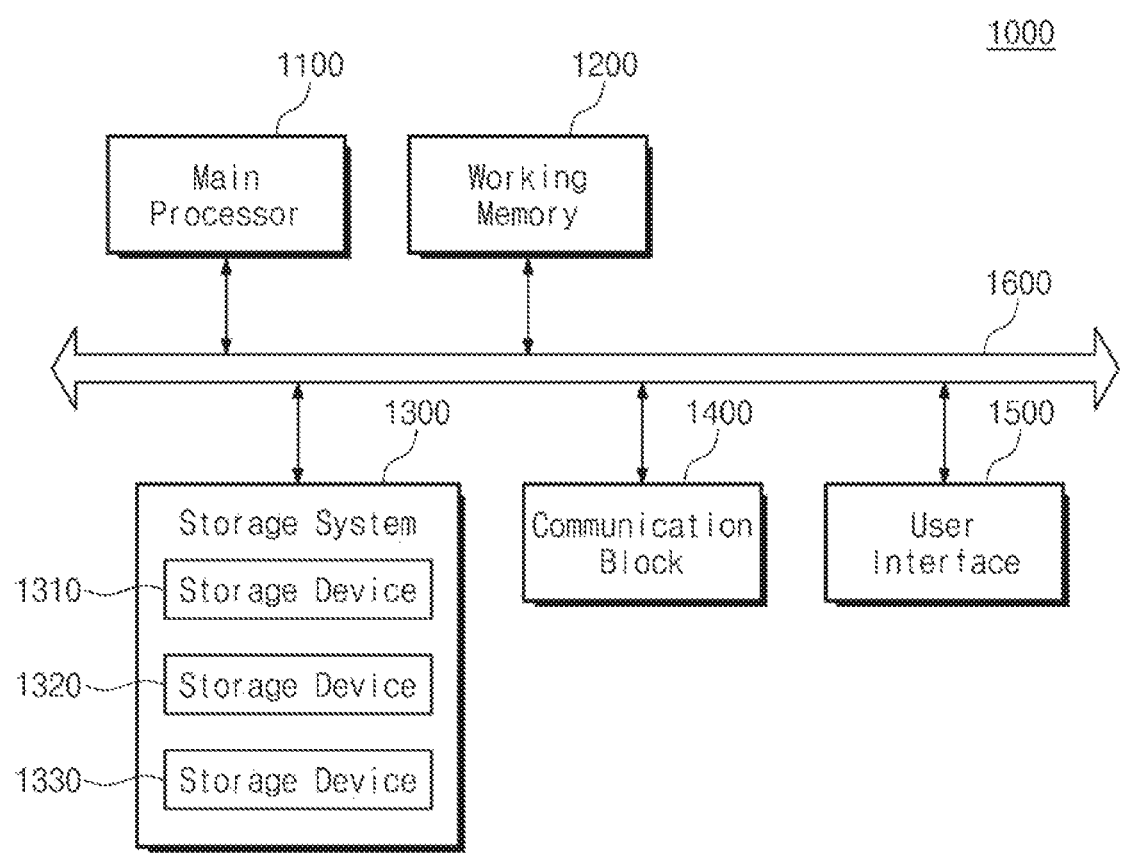
FIG. 1 is a block diagram illustrating an exemplary configuration of an electronic system according to some embodiments.

FIG. 1 is a block diagram illustrating an exemplary configuration of an electronic system according to some embodiments.

An electronic system 1000 may include a main processor 1100, working memory 1200, a storage system 1300, a communication block 1400, a user interface 1500, and a bus 1600. For example, the electronic system 1000 may be one of electronic devices such as a desktop computer, a laptop computer, a tablet computer, a smartphone, a wearable device, a video game console, workstation, one or more servers, an electric vehicle, home appliances, a medical device, etc.

The main processor 1100 may control overall operations of the electronic system 1000. For example, the main processor 1100 may be implemented with a general-purpose processor, a special-purpose processor, or an application processor, which includes one or more processor cores.

The working memory 1200 may store data to be used for an operation of the electronic system 1000. For example, the working memory 1200 may temporarily store data processed or to be processed by the main processor 1100. For example, the working memory 1200 may include a volatile memory such as a static random access memory (SRAM), a dynamic RAM (DRAM), or a synchronous DRAM (SDRAM), and/or a nonvolatile memory such as a phase-change RAM (PRAM), a magneto-resistive RAM (MRAM), a resistive RAM (ReRAM), or a ferroelectric RAM (FRAM).

The storage system 1300 may include one or more storage devices. For example, the storage system 1300 may include storage devices 1310, 1320, and 1330. Three storage devices 1310, 1320, and 1330 are illustrated in FIG. 1, but the number of storage devices included in the storage system 1300 may be variously changed or modified to satisfy the requirements of the electronic system 1000.

Each of the storage devices 1310, 1320, and 1330 may store data regardless of whether power is supplied thereto. For example, in some embodiments, each of the storage devices 1310, 1320, and 1330 may include a nonvolatile memory such as a flash memory, a PRAM, an MRAM, a ReRAM, or a FRAM. For example, in some embodiments, each of the storage devices 1310, 1320, and 1330 may include a storage medium such as a solid state drive (SSD), card storage, or embedded storage.

The communication block 1400 may support at least one of various wireless/wired communication protocols for the purpose of communicating with an external device/system of the electronic system 1000. The user interface 1500 may include various input/output interfaces for the purpose of performing communication arbitration between a user and the electronic system 1000.

The bus 1600 may provide a communication path between the components of the electronic system 1000. The components of the electronic system 1000 may exchange data with each other in compliance with a bus format of the bus 1600. For example, the bus format may include one or more of various interface protocols such as universal serial bus (USB), small computer system interface (SCSI), peripheral component interconnect express (PCIe), serial advanced technology attachment (SATA), serial attached SCSI (SAS), nonvolatile memory express (NVMe), universal flash storage (UFS), double data rate (DDR), and low power DDR (LPDDR).

The main processor 1100 may operate as a host device. The main processor 1100 may provide a service to a user by communicating with each of the storage devices 1310, 1320, and 1330. For example, the main processor 1100 may store data in the storage devices 1310, 1320, and 1330 and may read data stored in the storage devices 1310, 1320, and 1330.

According to an embodiment, the main processor 1100 may offload work associated with data to be stored in the storage devices 1310, 1320, and 1330 onto the storage devices 1310, 1320, and 1330. The storage devices 1310, 1320, and 1330 may perform the work associated with the data to be stored therein instead of the main processor 1100. For example, the storage device 1310 may receive data that is uncompressed data from the main processor 1100 and may compress the received data. That is, the work associated with the data to be stored in the storage device 1310 may be performed within the storage device 1310, not the main processor 1100. Accordingly, the workload of the host device may be decreased.

Below, exemplary configurations of the PCIe protocol and embodiments associated with the storage devices 1310, 1320, and 1330 will be described. However, various embodiments described in the present disclosure may be variously changed or modified so as to be adopted with regard to any other interface protocol in addition to the PCIe protocol. In addition, the various embodiments described in the present disclosure may be adopted to any electronic device (e.g., the working memory 1200) capable of storing and outputting data, as well as the storage devices 1310, 1320, and 1330. The following description are provided for better understanding, not intended to limit the embodiments.

Figure 2:
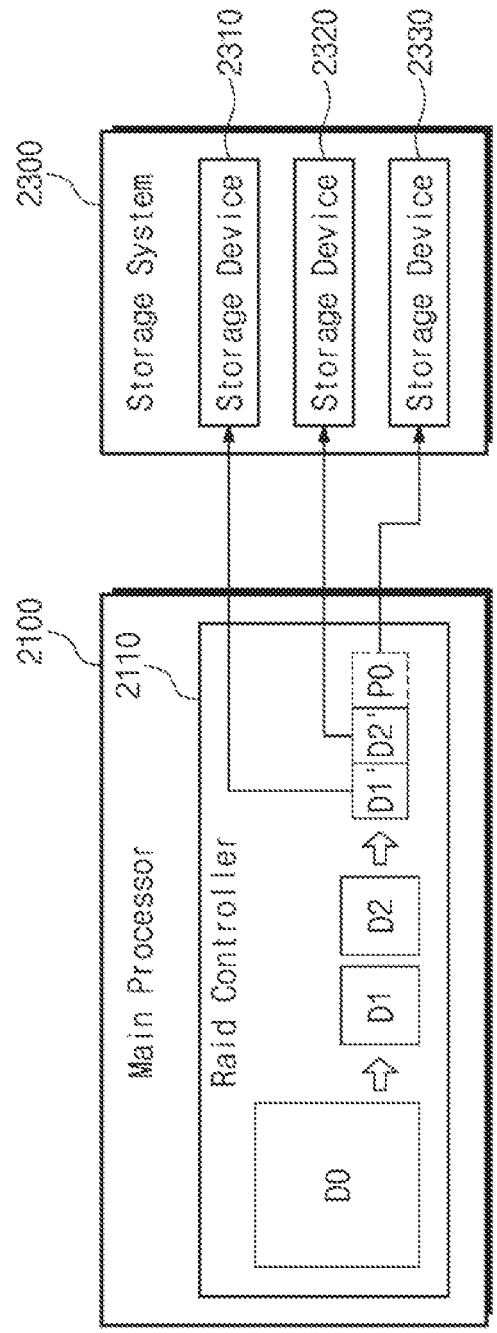
FIG. 2 is a conceptual diagram for describing a general RAID scheme in which a main processor performs work associated with data to be stored in a storage system.

FIG. 2 is a conceptual diagram for describing a general RAID scheme in which a main processor performs work associated with data to be stored in a storage system.

The main processor 1100 may include a RAID controller 2110. According to the RAID scheme, data may be managed in units of a stripe. For better understanding, it is assumed that each of data D0 and different data to be described later has a size corresponding to one stripe. However, embodiments are not limited to this assumption. In some embodiments, some data may have a size smaller than one stripe or may have a size corresponding to a plurality of stripes.

One stripe may be divided into a plurality of data chunks. For example, the RAID controller 2110 may divide the data D0 into data chunks D1 and D2. Embodiments are not limited to the example of FIG. 2. For example, in some embodiments, RAID parameters, such as a data size corresponding to one stripe, a data size corresponding to one data chunk, the number of data chunks included in one stripe, etc., may be changed or modified depending on various factors such as performance, reliability, and a storage capacity.

The data chunks D1 and D2 may be converted to have a format capable of being stored in a storage system 2300. For example, the RAID controller 2110 may compress the data chunks D1 and D2 to data D1' and D2'. A size of the data D1' may be smaller than a size of the data chunk D1, and a size of the data D2' may be smaller than a size of the data chunk D2. For example, each of the sizes of the data chunks D1 and D2 may be 128 KB, and each of the sizes of the data D1' and D2' may be smaller than 128 KB.

The RAID controller 2110 may generate a parity P0 associated with the data D1' and the data D2' by using the data D1' and the data D2'. The RAID controller 2110 may perform various operations for the purpose of generating the data D1', the data D2', and the parity P0 based on the data D0. In the case where a portion of the data D1' and the data D2' is lost or damaged, the parity P0 may be used to recover or restore a lost or damaged data chunk.

The RAID controller 2110 may store the data D1', the data D2', and the parity P0 in storage devices 2310, 2320, and 2330. That is, the data D1', the data D2', and the parity P0 may each be stored in different storage devices 2310, 2320, and 2330 under control of the RAID controller 2110.

Figure 3:
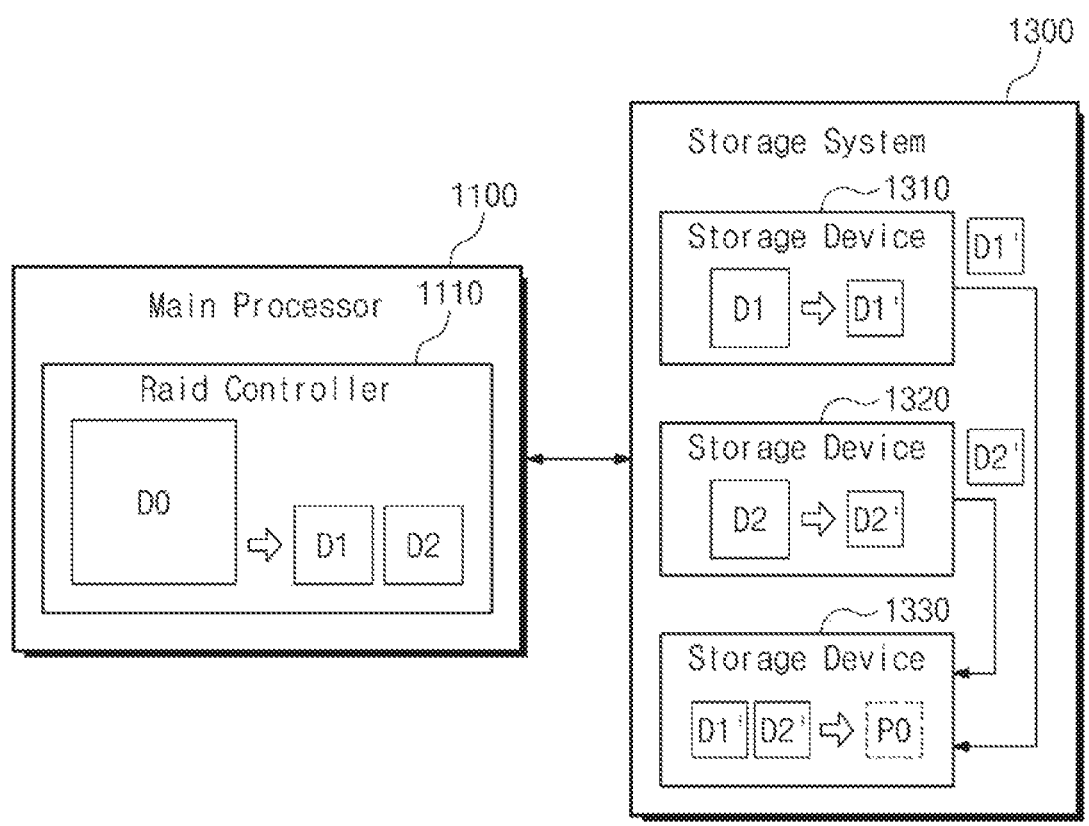
FIG. 3 is a conceptual diagram for describing an RAID scheme in which a storage device performs work associated with data to be stored in a storage system, according to some embodiments.

FIG. 3 is a conceptual diagram for describing an RAID scheme in which a storage device performs work associated with data to be stored in a storage system, according to some embodiments.

As described with reference to FIG. 1, the main processor 1100 may provide a service to the user by communicating with each of the storage devices 1310, 1320, and 1330. The main processor 1100 may include an RAID controller 1110. The RAID controller 1110 may divide the data D0 into the data chunks D1 and D2. A size of each of the data chunks D1 and D2 may be smaller than a size of the data D0.

The RAID controller 1110 may output the data chunks D1 and D2 to different storage devices 1310 and 1320, respectively. In the following description, for convenience of description, it is assumed that the data chunks D1 and D2 are output to the storage devices 1310 and 1320, but embodiments are not limited thereto. For example, the data chunks D1 and D2 may be output to different storage devices among the storage devices 1310, 1320, and 1330.

That is, the RAID controller 1110 according to an embodiment may output the data chunks D1 and D2 to the storage devices 1310 and 1320 without the process of performing work associated with the data chunks D1 and D2. The RAID controller 1110 may request the work associated with the data chunks D1 and D2 from the storage devices 1310 and 1320 at the time the RAID controller 1110 outputs the data chunks D1 and D2 to the storage system 1300.

The storage system 1300 may include the storage devices 1310, 1320, and 1330. The storage devices 1310 and 1320 among the storage devices 1310, 1320, and 1330 may receive the data chunks D1 and D2. The storage devices 1310 and 1320 may perform the work associated with the data chunks D1 and D2 in response to the request of the RAID controller 1110. In the following description, for convenience of description, it is assumed that the work associated with the data chunks D1 and D2 is compression work, but embodiments are not limited thereto. The work associated with the data chunks D1 and D2 may include compression, data deduplication, checksum, encryption, etc.

The storage devices 1310 and 1320 may compress the data chunks D1 and D2 to generate the data D1' and the data D2'. A size of the data D1' may be smaller than a size of the data chunk D1, and a size of the data D2' may be smaller than a size of the data chunk D2.

The storage devices 1310 and 1320 may output information indicating the size of each of the data D1' and the data D2' to the RAID controller 1110. The RAID controller 1110 may designate a storage location, at which each of the data D1' and the data D2' is to be stored, based on size information of each of the data D1' and the data D2'. For example, in the case where one of the storage devices 1310, 1320, and 1330 is designated as a storage location at which the data D1' is to be stored, one of the remaining storage devices may be designated as a storage location at which the data D2' is to be stored. Also, the remaining storage device other than the storage devices designated as the storage locations of the data D1' and the data D2' may be designated as an area in which the parityP0 is generated and stored. In FIG. 3, it is assumed that the storage device 1310 is designated as a storage location of the data D1', the storage device 1320 is designated as a storage location of the data D2', and the storage device 1330 is designated as a generation and storage location of the parity P0, but embodiments are not limited thereto.

The RAID controller 1110 may store the size information of each of the data D1' and the data D2' and information of locations where the data D1', the data D2', and the parity P0 are stored. The RAID controller 1110 may search the storage devices 1310, 1320, and 1330 for the data D1', the data D2', and the parity P0, based on the stored information.

The RAID controller 1110 may output signals including the information about the storage locations of the data D1', the data D2', and the parity P0. The storage devices 1310, 1320, and 1330 may store the data D1', the data D2', and the parity P0 based on the signals received from the RAID controller 1110. The storage devices 1310 and 1320 may store the data D1' and the data D2' in the storage locations of the data D1' and the data D2' based on the signals received from the RAID controller 1110. Also, the storage devices 1310 and 1320 may output the data D1' and the data D2' to the generation location of the parity P0 based on the signals received from the RAID controller 1110. For example, the storage devices 1310 and 1320 may output the data D1' and the data D2' to the storage device 1330 being the generation location of the parity P0. The storage device 1330 may generate the parity P0 based on the data D1' and the data D2'. Also, the storage device 1330 may store the parity P0.

According to an embodiment, the work that is performed in the general RAID controller 2110 of FIG. 2 may be performed in the storage devices 1310, 1320, and 1330. In detail, the storage devices 1310, 1320, and 1330 may perform work, such as compression, data deduplication, checksum, or encryption, on the data D1' and the data D2' and may generate the parity P0. Accordingly, the workload of the main processor 1100 may be decreased.

Also, the storage devices 1310, 1320, and 1330 may transfer the size information of the data D1' and the data D2' to the main processor 1100 rather than the data D1' and the data D2' itself, thus reducing the amount of information exchanged between the storage devices 1310, 1320, and 1330 and the main processor 1100. Accordingly a speed at which the storage devices 1310, 1320, and 1330 and the main processor 1100 communicate with each other may be increased.

Figure 4:
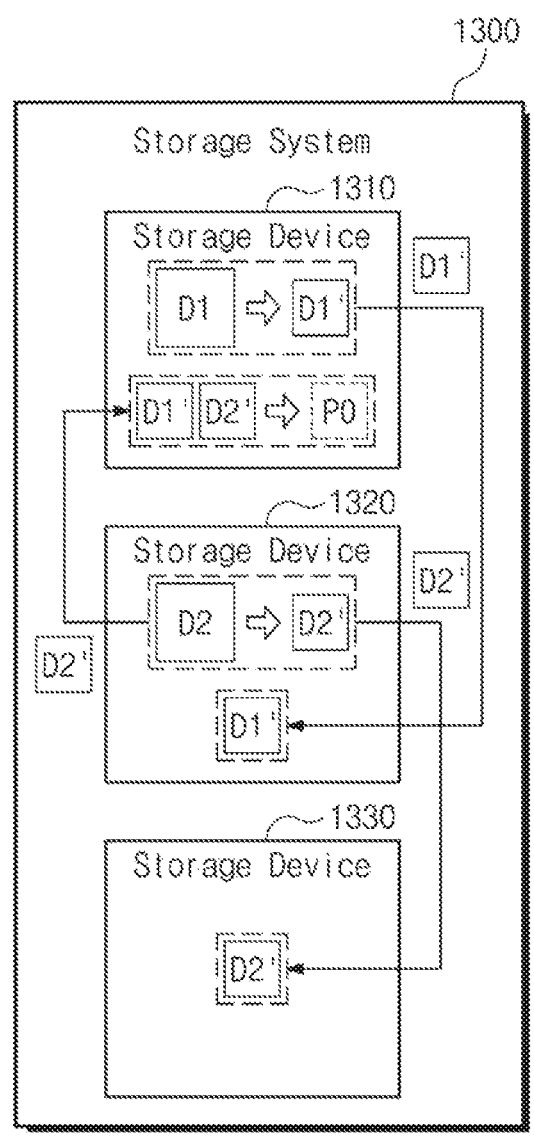
FIG. 4 is a conceptual diagram illustrating another embodiment in which data and a parity are stored in storage devices of the RAID scheme of FIG. 3.

FIG. 4 is a conceptual diagram illustrating another embodiment in which data and a parity are stored in storage devices of the RAID scheme of FIG. 3.

Referring to FIG. 4, the case where the data D1' and the data D2' are generated at the storage devices 1310 and 1320 and are then stored in the storage devices 1320 and 1330 and the parity P0 is generated at the storage device 1310. In this case, the storage device 1310 may compress the data chunk D1 and may provide the data D1' being compressed data to the storage device 1320. The storage device 1320 may store the provided data D1'. The storage device 1320 may compress the data chunk D2 and may provide the data D2' being compressed data to the storage device 1330. The storage device 1330 may store the provided data D2'. Also, the storage device 1320 may provide the data D2' to the storage device 1310. The storage device 1310 may generate the parity P0 based on the data D1' and the data D2'. The storage device 1310 may store the generated parity P0.

Figure 5:
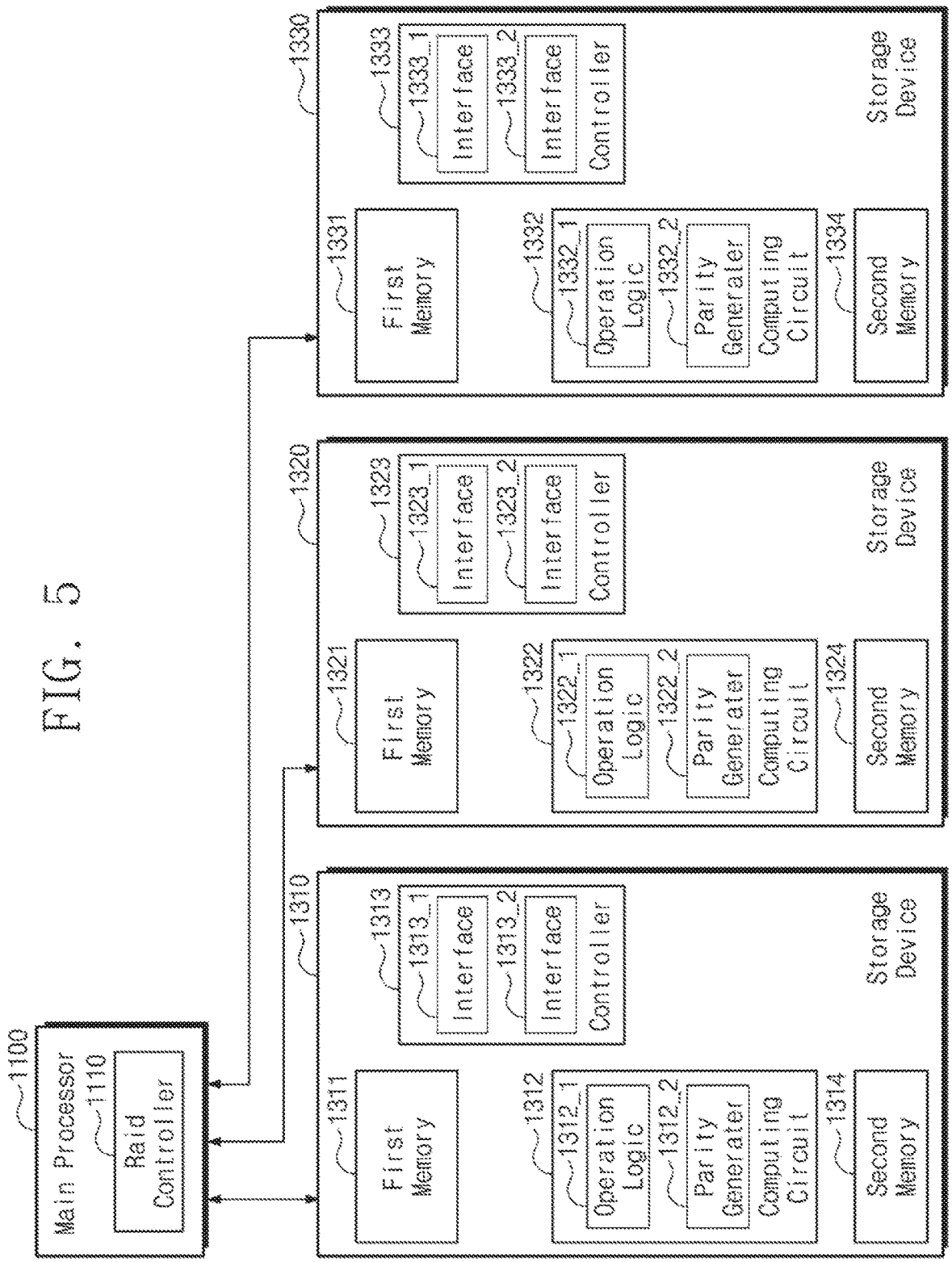
FIG. 5 is a block diagram illustrating configurations of storage devices of the RAID scheme of FIG. 3.

FIG. 5 is a block diagram illustrating configurations of storage devices of the RAID scheme of FIG. 3, according to some embodiments.

The main processor 1100 may communicate with the storage devices 1310, 1320, and 1330. The storage devices 1310, 1320, and 1330 may perform the work associated with the data chunks D1 and D2, which are described with reference to FIG. 3. In some embodiments, the storage devices 1310, 1320, and 1330 may perform the work associated with the data chunks D1 and D2, in response to a request of the main processor 1100. In some embodiments, the request may be the outputting of the data chunks D1 and D2 from the main processor 1100 to the memory system 1300. In other embodiments, the request may be a separate request from the outputting of the data chunks D1 and D2. The storage devices 1310, 1320, and 1330 may perform peer-to-peer communication with each other. The storage devices 1310, 1320, and 1330 may store the data D1' and the data D2' at designated locations without the process of transferring the data D1' and the data D2' to the main processor 1100 by performing the peer-to-peer communication.

Configurations and operations of the storage devices 1320 and 1330 are substantially identical to a configurations and an operation of the storage device 1310, and thus, the configuration and operation of the storage device 1310 will be mainly described with reference to FIG. 5 for conciseness.

The storage device 1310 may include a first memory 1311, a computing circuit 1312, a controller 1313, and a second memory 1314.

The first memory 1311 may store data to be used for operations of the storage device 1310. The first memory 1311 may temporarily store intermediate results and final results of the operations of the storage device 1310. The first memory 1311 may be a volatile memory such as a static random access memory (SRAM), a dynamic RAM (DRAM), or a synchronous DRAM (SDRAM). However, embodiments are not limited thereto. For example, the first memory 1311 may be a nonvolatile memory such as a phase-change RAM (PRAM), a magneto-resistive RAM (MRAM), a resistive RAM (ReRAM), or a ferro-electric RAM (FRAM).

The first memory 1311 may store the data chunk D1 received from the main processor 1100 and the data D1' being a result of compressing the data chunk D1. In detail, the first memory 1311 may temporarily store the data D1' until a storage location of the data D1' is designated by the main processor 1100. In the case where a parity is calculated at the storage device 1310, the first memory 1311 may store intermediate results and final results that are generated and processed while the parity is calculated.

The computing circuit 1312 may include operation logic 1312_1 and a parity generator 1312_2. The computing circuit 1312 may respond to a request for storing the data chunk D1, which is received from the main processor 1100, by using the operation logic 1312_1. In response to the request of the main processor 1100, the operation logic 1312_1 may perform work on the data chunk D1 to generate the data D1'. For example, the operation logic 1312_1 may compress the data chunk D1 to generate the data D1'.

In the case where the parity is calculated by the storage device 1310, the computing circuit 1312 may generate the parity by using the parity generator 1312_2. The parity generator 1312_2 may generate the parity P0, based on a signal received from the main processor 1100.

The controller 1313 may include interfaces 1313_1 and 1313_2. Each of the interfaces 1313_1 and 1313 2 may include a physical layer and/or a logical layer configured to transfer/receive and process data, a signal, and/or a packet to allow the controller 1313 to communicate with a component present in the outside of the controller 1313. Each of the interfaces 1313_1 and 1313_2 may include a hardware circuit configured to process communication between the controller 1313 and an external component.

The controller 1313 may communicate with the main processor 1100 by using the interface 1313_1. By using the interface 1313_1, the controller 1313 may receive the data chunk D1 from the main processor 1100 and may transfer size information of the data D1' to the main processor 1100. Also, by using the interface 1313_1, the controller 1313 may receive information about a storage location where the data D1' is to be stored, from the main processor 1100.

The controller 1313 may perform peer-to-peer communication with the different storage devices 1320 and 1330, by using the interface 1313_2. By using the interface 1313_2, the controller 1313 may receive data and signals from the different storage devices 1320 and 1330 and may transfer the data and the signals to the different storage devices 1320 and 1330. For example, the controller 1313 may output the data D1' to a storage location where the main processor 1100 designates, by using the interface 1313_2.

The second memory 1314 may store the data D1', the data D2', or the parity P0 according to the storage location indicated by the main processor 1100. In detail, in the case where the storage location of the data D1' is designated to the storage device 1310 by the main processor 1100, the second memory 1314 may store the data D1'. In the case where a read request is received from the main processor 1100, the storage device 1310 may read the data D1' from the second memory 1314. The second memory 1314 may be a nonvolatile memory such as a phase-change RAM (PRAM), a magneto-resistive RAM (MRAM), a resistive RAM (ReRAM), or a ferro-electric RAM (FRAM).

FIGS. 6 to 11 are block diagrams for describing exemplary operations associated with the storage devices of the RAID scheme of FIG. 3, according to some embodiments. Exemplary operations of FIGS. 6 to 11 show the process in which the storage devices 1310, 1320, and 1330 perform work associated with the data chunks D1 and D2 and store the data D1' and the data D2' through the peer-to-peer communication without the process of transferring the data D1' and the data D2' to the main processor 1100.

Figure 6:
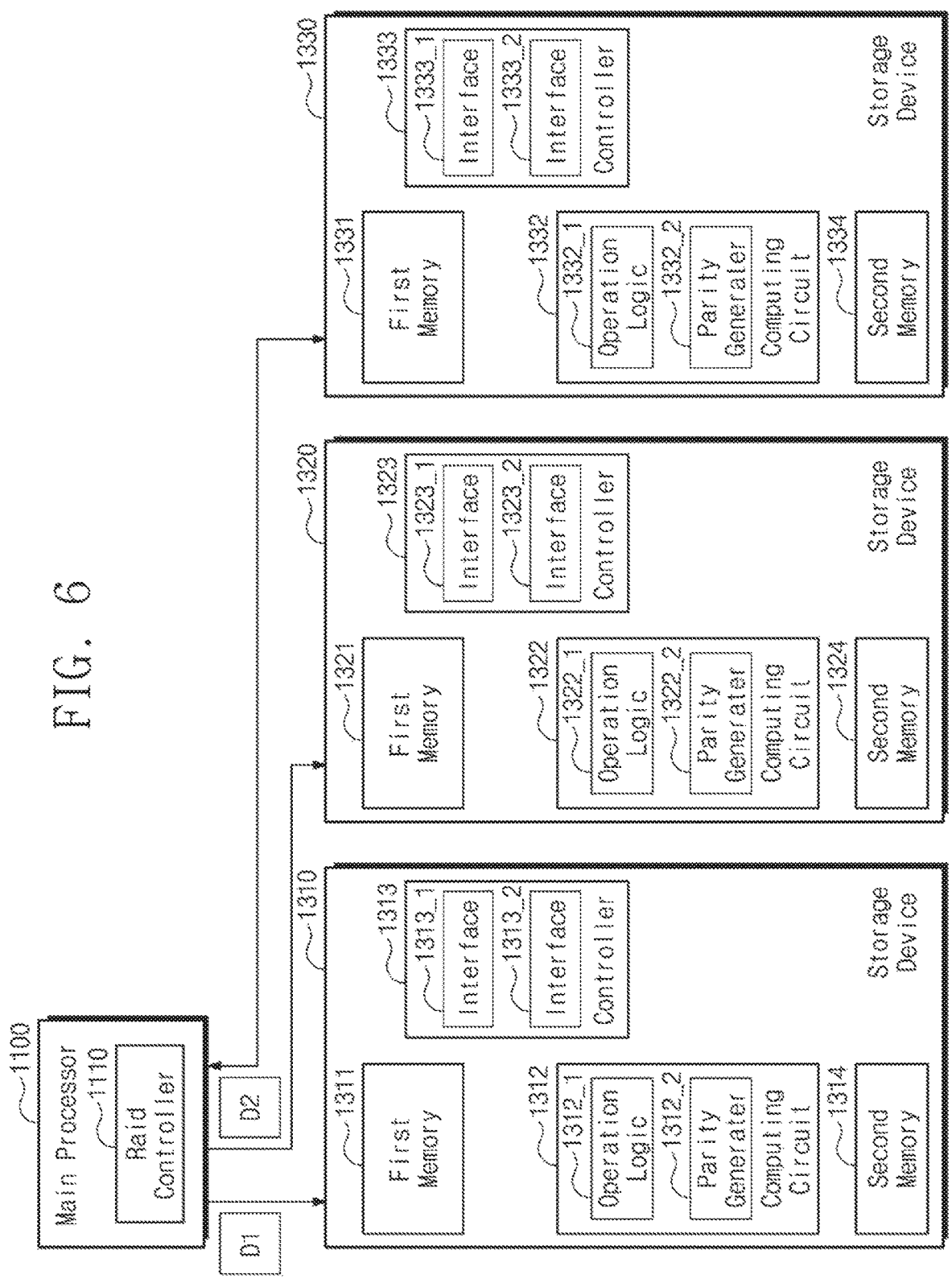
FIGS. 6 to 11 are block diagrams for describing exemplary operations associated with storage devices of the RAID scheme of FIG. 3, according to some embodiments.

Referring to FIG. 6, the main processor 1100 may output the data chunks D1 and D2 to the storage devices 1310 and 1320. The storage devices 1310 and 1320 may receive the data chunks D1 and D2 through the interfaces 1313_1 and 1323_1, respectively. The first memories 1311 and 1321 may store the data chunks D1 and D2, respectively. In the following description, it is assumed that the data chunks D1 and D2 are transferred to the storage devices 1310 and 1320, but embodiments are not limited thereto. The data chunks D1 and D2 may be transferred to two different storage devices among the storage devices 1310, 1320, and 1330.

Figure 7:
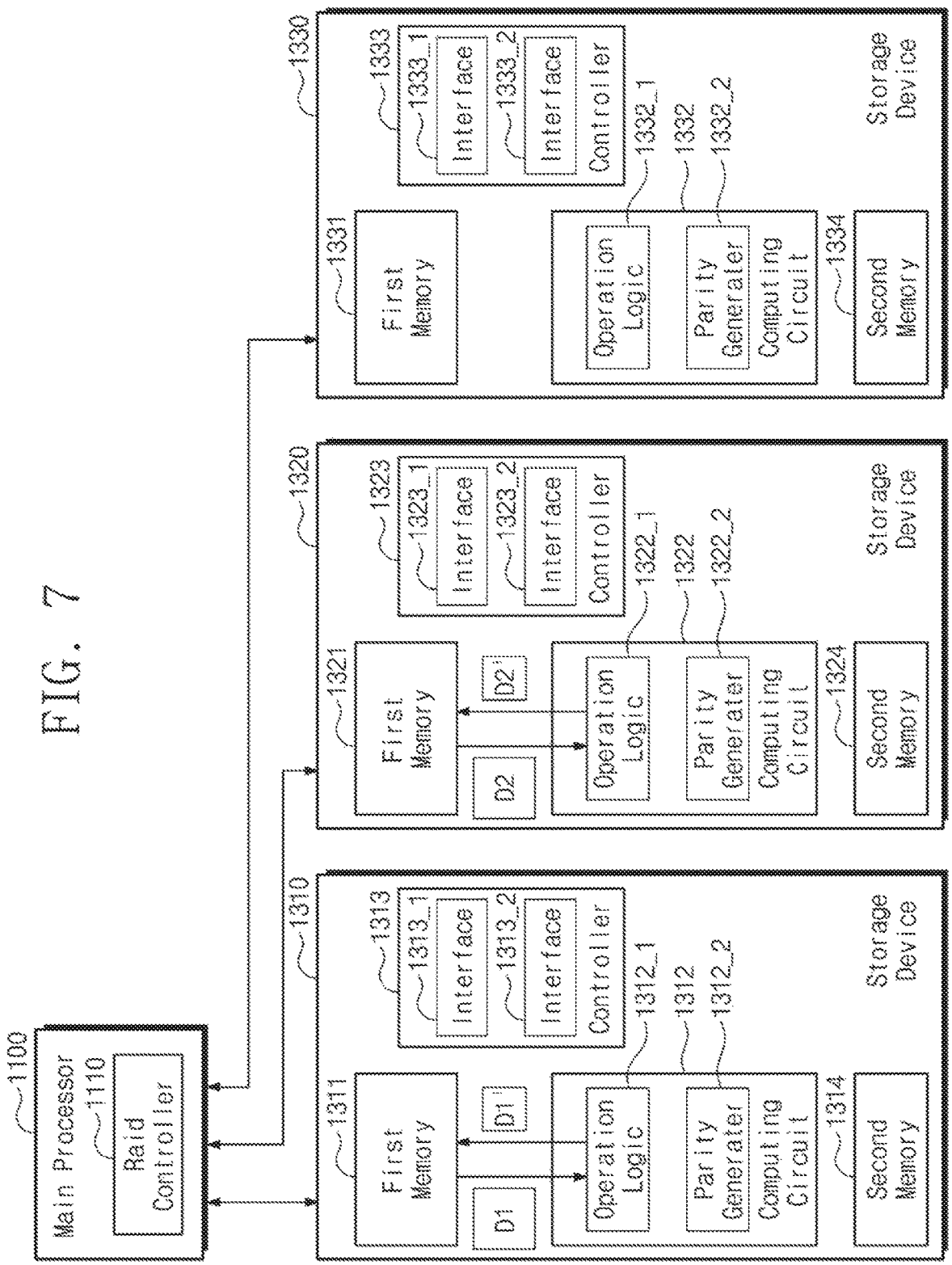

Referring to FIG. 7, the operation logics 1312_1 and 1322_1 may receive the data chunks D1 and D2 from the first memories 1311 and 1321, respectively. The operation logics 1312_1 and 1322_1 may perform work associated with the data chunks D1 and D2, which is requested from the main processor 1100. In the following description, it is assumed that the work requested from the main processor 1100 is compression, but embodiments are not limited thereto. In some embodiments, the work requested from the main processor 1100 may be work, which is performed on the data chunks D1 and D2 for the purpose of generating the data D1', the data D2', and the parity P0 to be stored in the storage devices 1310, 1320, and 1330, such as compression, data deduplication, checksum, or encryption. The operation logics 1312_1 and 1322_1 may compress the data chunks D1 and D2 to generate the data D1' and the data D2', respectively.

Figure 8:
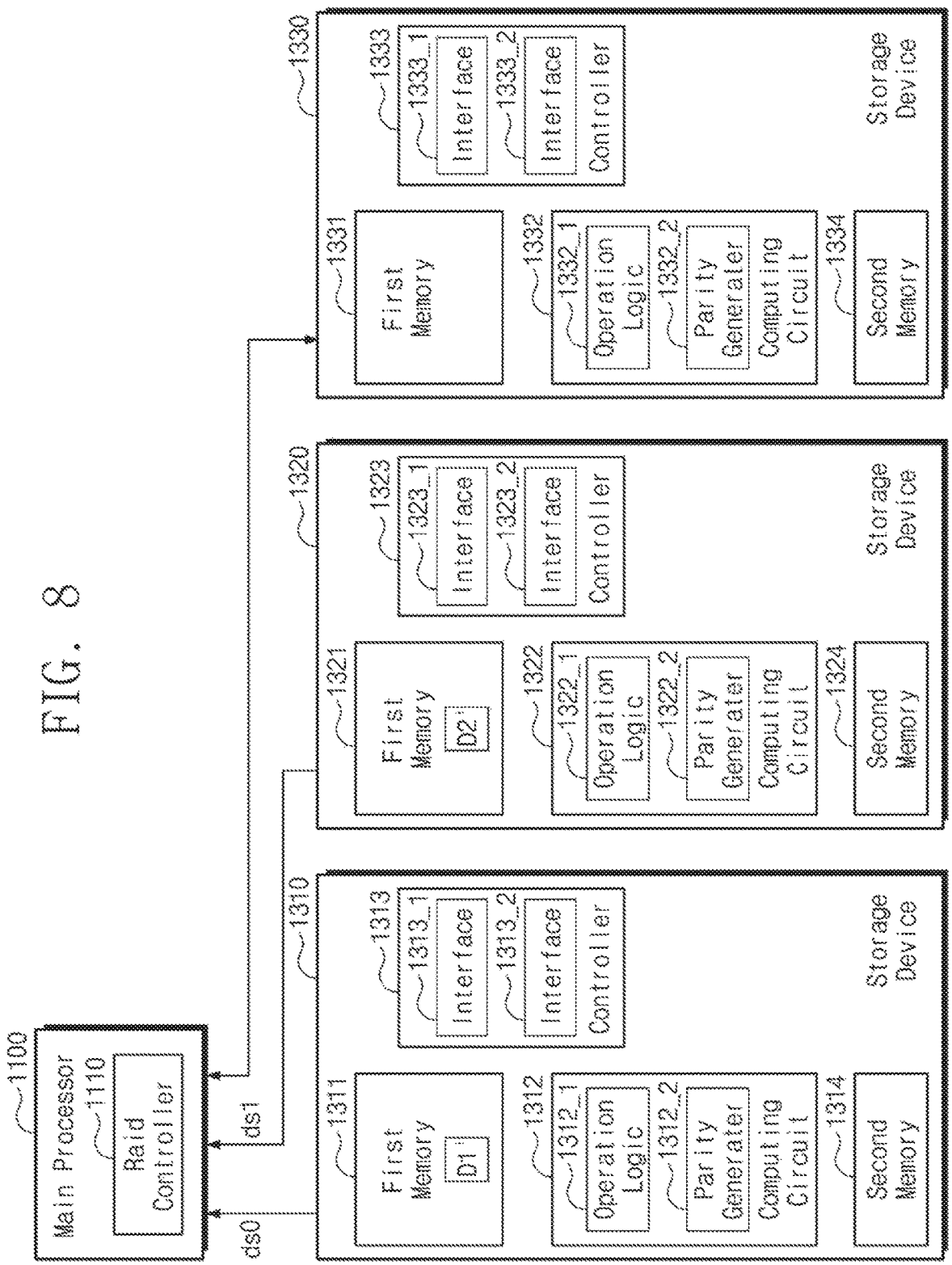

Referring to FIG. 8, the first memories 1311 and 1321 may include the data D1' and the data D2'. The operation logics 1312_1 and 1322_1 may generate signals ds0 and ds1, based on the data D1' and the data D2' stored in the first memories 1311 and 1321, respectively. The signals ds0 and ds1 may include size information of the data D1' and the data D2', respectively. The storage devices 1310 and 1320 may output the signals ds0 and ds1 to the main processor 1100 through the interfaces 1313_1 and 1323_1, respectively.

Figure 9:
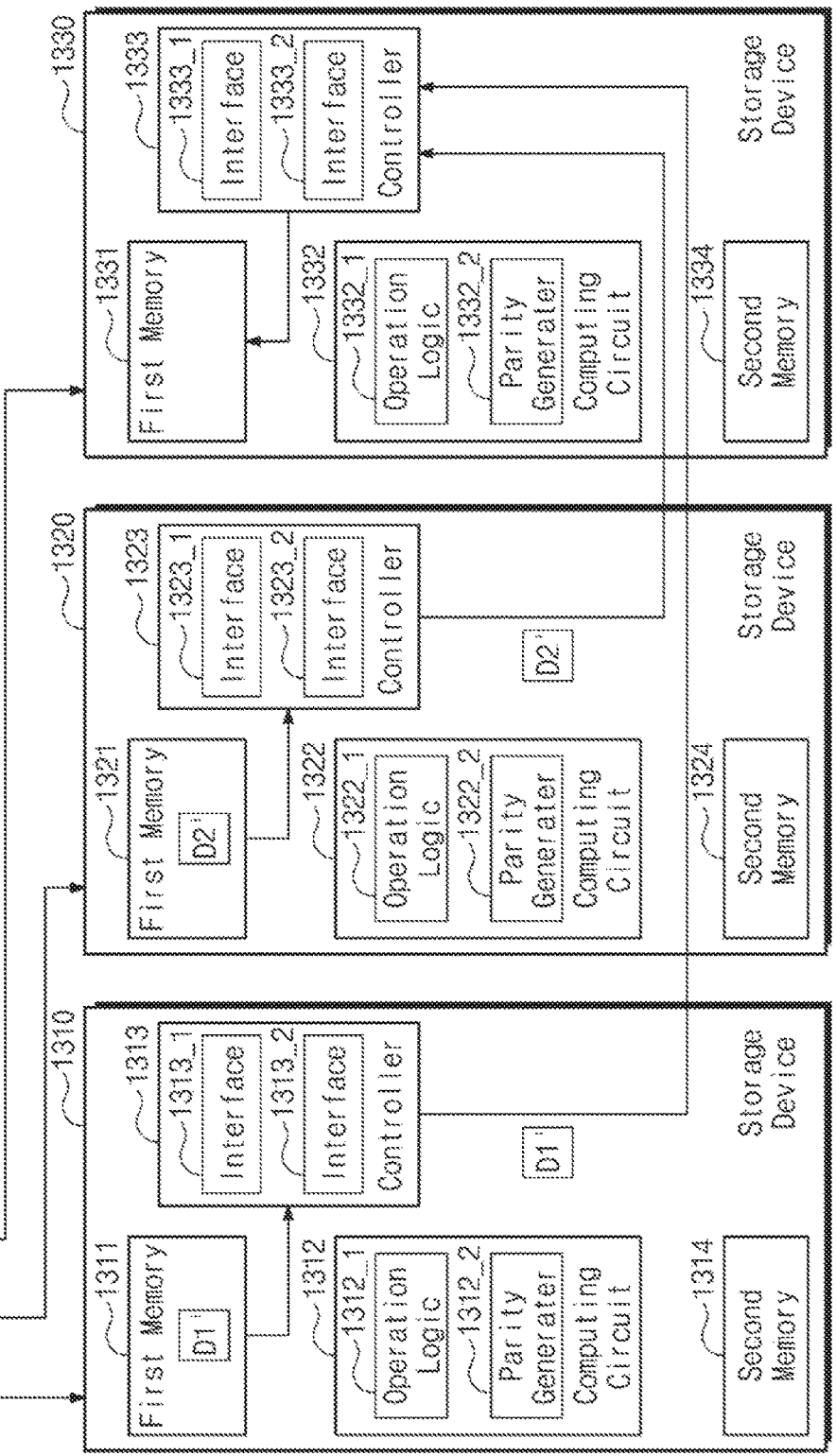

Referring to FIG. 9, the main processor 1100 may determine locations where the data D1', the data D2', and the parity P0 are to be stored, based on the signals ds0 and ds1. In detail, the main processor 1100 may determine locations where the data D1', the data D2', and the parity P0 are to be stored, based on size information of the data D1' and the data D2'. The main processor 1100 may generate signals rs0, rs1, and rs2. The signals rs0, rs1, and rs2 may indicate storage locations where the data D1', the data D2', and the parity P0 are to be stored, respectively.

The storage devices 1310, 1320, and 1330 may receive the signals rs0, rs1, and rs2 through the interfaces 1313_1, 1323_1, and 1333_1, respectively. The storage devices 1310 and 1320 may transfer the data D1' and the data D2' stored in the first memories 1311 and 1321, respectively, to different storage devices based on the signals rs0 and rs1. In detail, the storage devices 1310 and 1320 may transfer the data D1' and the data D2' to storage devices that the signals rs0 and rs1 indicate. The storage devices 1310 and 1320 may transfer the data D1' and the data D2' to storage locations of the data D1' and the data D2' and a generation location of the parity P0.

As described with reference to FIG. 3, in some embodiments, the storage device 1310 may be designated as a storage location of the data D1', the storage device 1320 may be designated as a storage location of the data D2', and the storage device 1330 may be designated as a generation and storage location of the parity P0. In this case, the storage devices 1310 and 1320 may output the data D1' and the data D2', respectively, to the storage device 1330 through the interfaces 1313_2 and 1323_2, respectively, and the storage device 1330 may receive the data D1' and the data D2' through the interface 1333_2.

In some embodiments, the storage devices 1310 and 1320 may output the data D1' and the data D2' to the storage locations of the data D1' and the data D2' that the signals rs0 and rs1 indicate, respectively. In some embodiments, the storage devices 1310 and 1320 may output the data D1' and the data D2' to the storage location of the parity P0 that the signals rs0 and rs1 indicate. As described with reference to FIG. 4, in some embodiments, the storage devices 1320 and 1330 may be designated as the storage locations of the data D1' and the data D2', respectively, and the storage device 1310 may be designated as the generation and storage location of the parity P0. In this case, the storage device 1310 may output the data D1' to the storage device 1320. The storage device 1320 may output the data D2' to the storage device 1330. Also, in detail, the storage device 1320 may output the data D2' to the storage device 1310.

Figure 10:
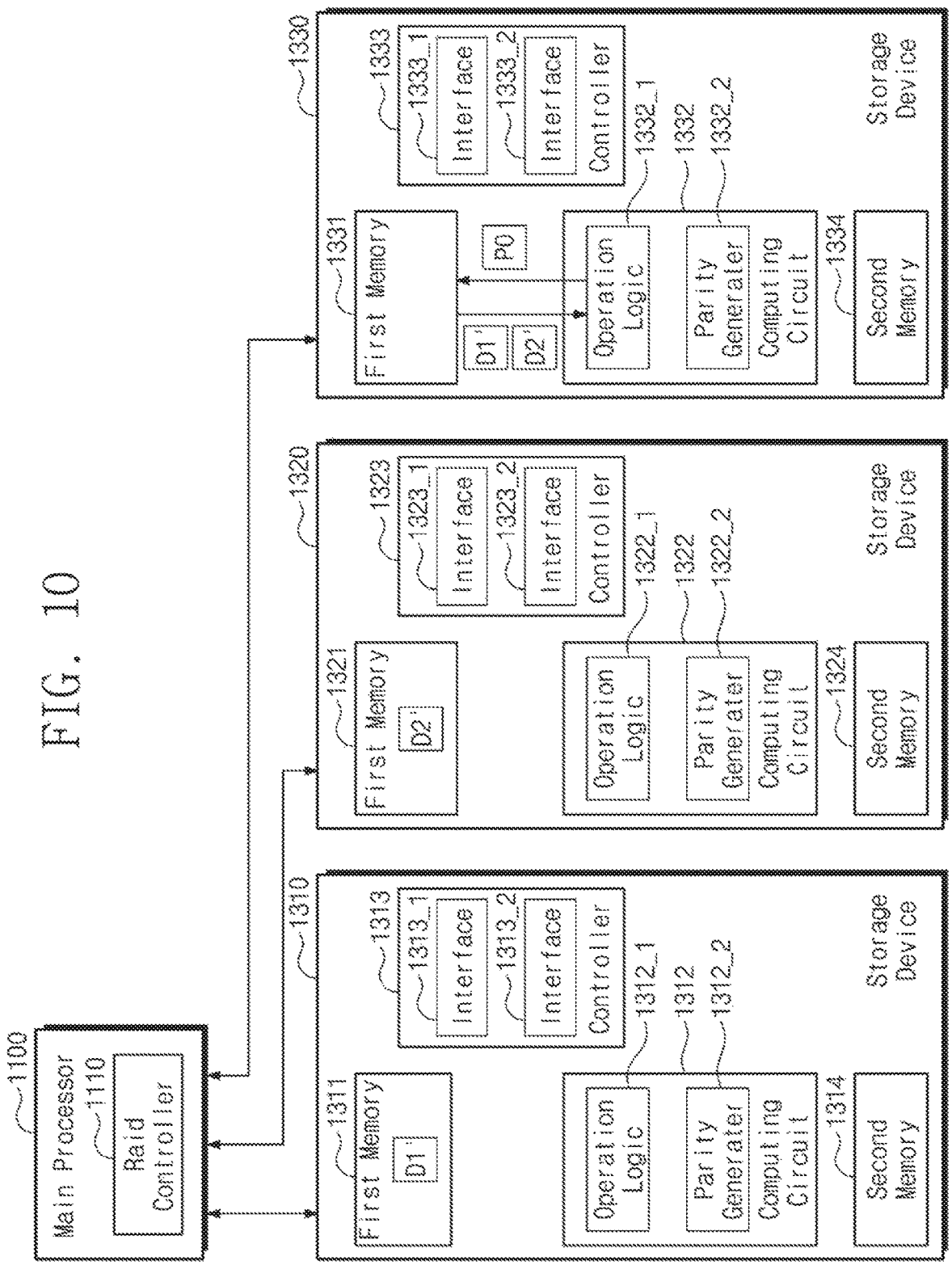

Referring to FIG. 10, the operation logic 1332_2 may perform a parity calculation based on the data D1' and the data D2'. The operation logic 1332_2 may generate the parity P0 by performing the parity calculation.

Figure 11:
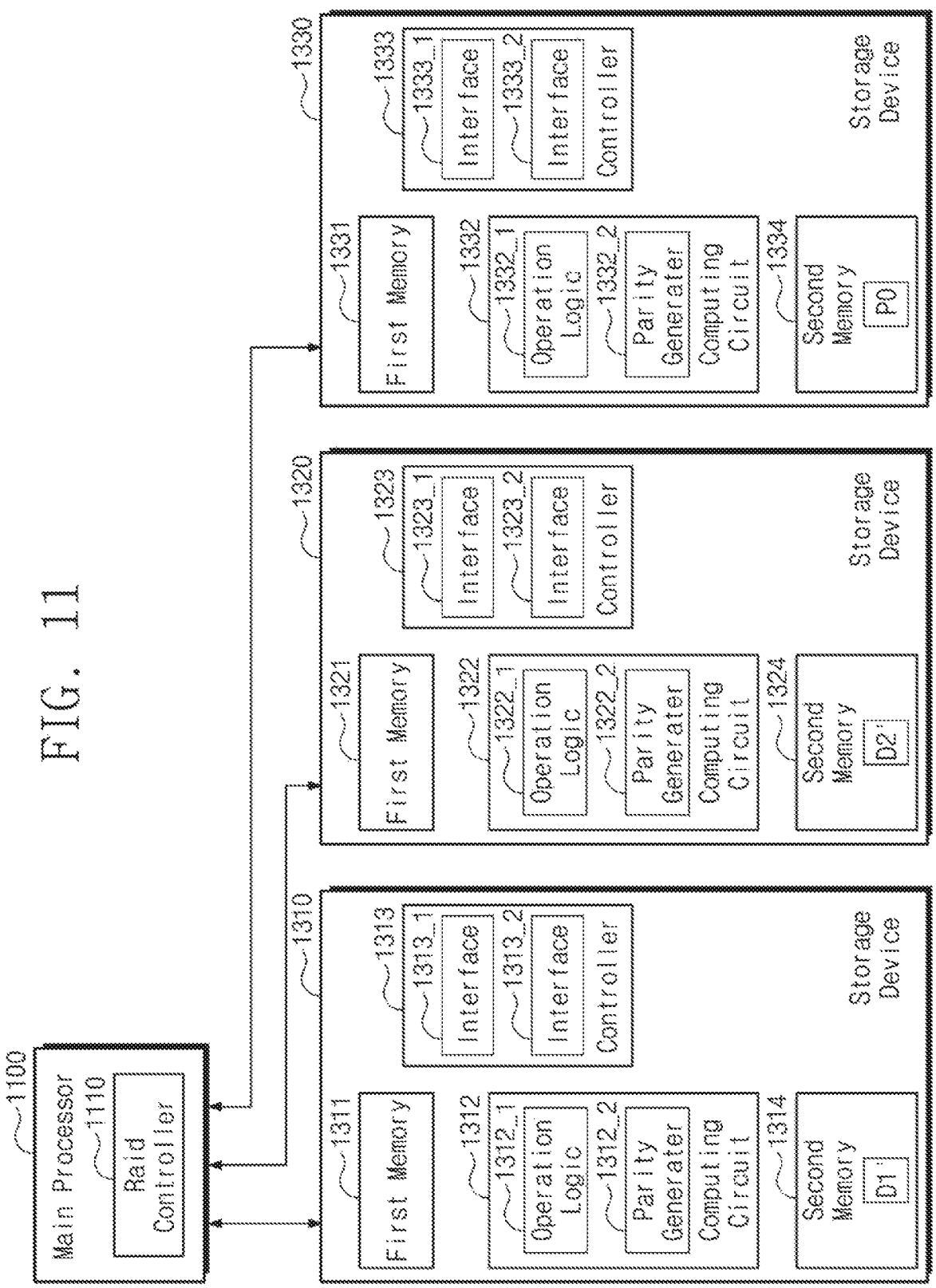

Referring to FIG. 11, the storage devices 1310, 1320, and 1330 may store the data D1', the data D2', and the parity P0 in the second memories 1314, 1324, and 1334, respectively. The main processor 1100 may retain address information indicating locations where the data D1', the data D2', and the parity P0 are stored. The main processor 1100 may read or search for the data D1' or the data D2', based on the address information.

Figure 12:
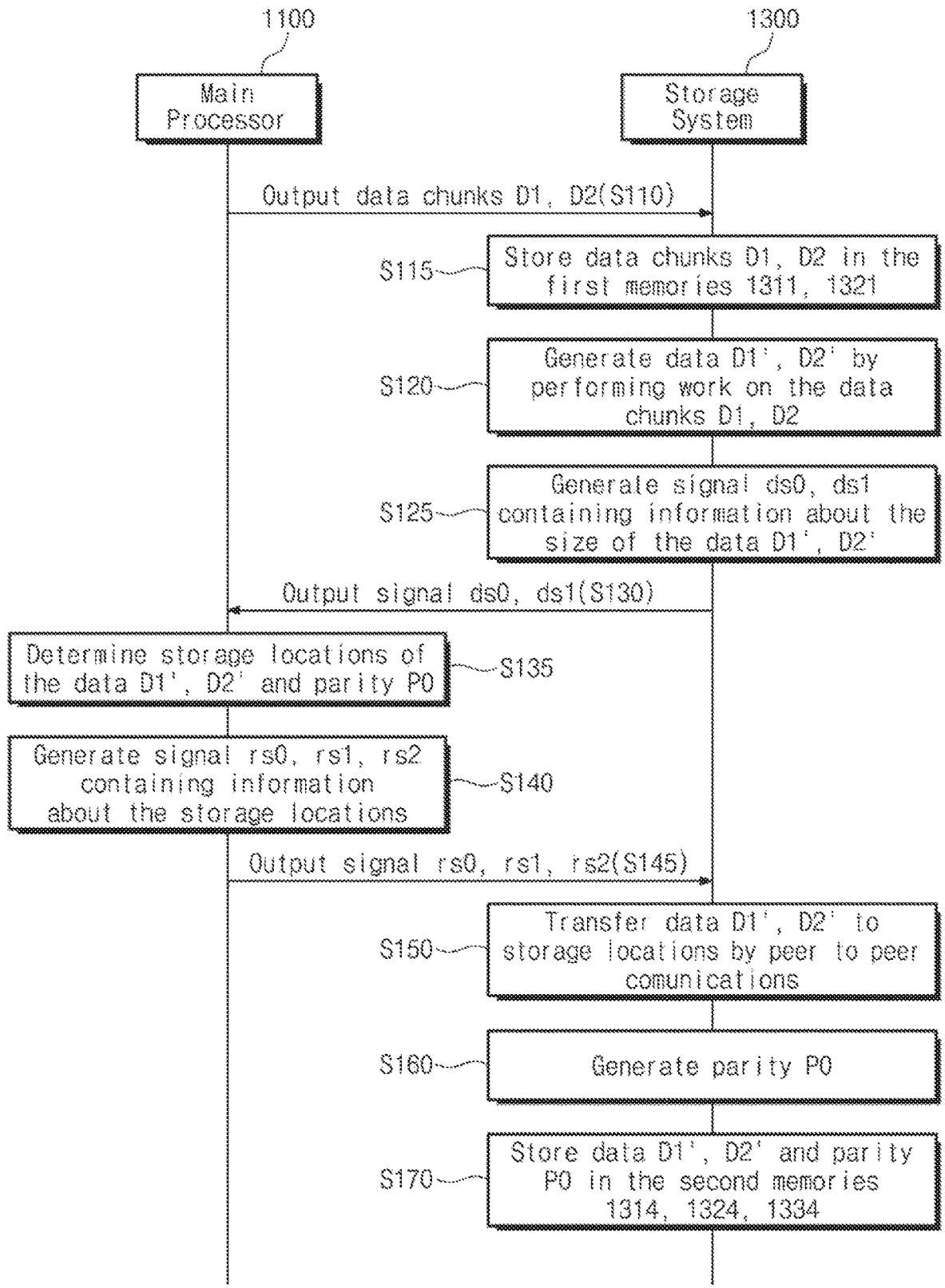
FIG. 12 is a flowchart for describing operations of a main processor and a storage system of the RAID scheme of FIG. 3, according to some embodiments.

FIG. 12 is a flowchart for describing operations of a main processor and a storage system of the RAID scheme of FIG. 3, according to some embodiments.

In operation S110, the main processor 1100 may output the data chunks D1 and D2 to the storage system 1300.

In operation S115, the storage system 1300 may store the data chunks D1 and D2 received from the main processor 1100 in the first memories 1311 and 1321, respectively.

In operation S120, the storage system 1300 may perform work associated with the data chunks D1 and D2. In some embodiments, the storage system 1300 may perform work associated with the data chunks D1 and D2 in response to a request of the main processor 1100. In some embodiments, the request may be the outputting of the data chunks D1, D2 in operation S110. In other embodiments, the request may be a separate request from the outputting of the data chunks D1 and D2. The storage system 1300 may perform the work associated with the data chunks D1 and D2 to generate the data D1' and the data D2'.

In operation S125, the storage system 1300 may generate the signals ds0 and ds1 based on the data D1' and the data D2', respectively. The signals ds0 and ds1 may include information about sizes of the data D1' and the data D2', respectively.

In operation S130, the storage system 1300 may output the signals ds0 and ds1 to the main processor 1100.

In operation S135, the main processor 1100 may determine storage locations of the data D1' and the data D2' and a generation location of the parity P0, based on the signals ds0 and ds1.

In operation S140, the main processor 1100 may generate the signals rs0, rs1, and rs2. The signals rs0, rs1 and rs2 may include information about the storage locations of the data D1' and the data D2' and information about the generation location of the parity P0, respectively.

In operation S145, the main processor 1100 may output the signals rs0, rs1, and rs2 to the storage system 1300.

In operation S150, the storage system 1300 may transfer internally the data D1' and the data D2' to the storage locations of the data D1' and the data D2' and the generation location of the parity P0 through the peer-to-peer communication, based on the signals rs0, rs1, and rs2.

In operation S160, the storage system 1300 may generate the parity P0 based on the data D1' and the data D2'.

In operation S170, the storage system 1300 may store the data D1', the data D2', and the parity P0 in the second memories 1314, 1324, and 1334, respectively.

Figure 13:
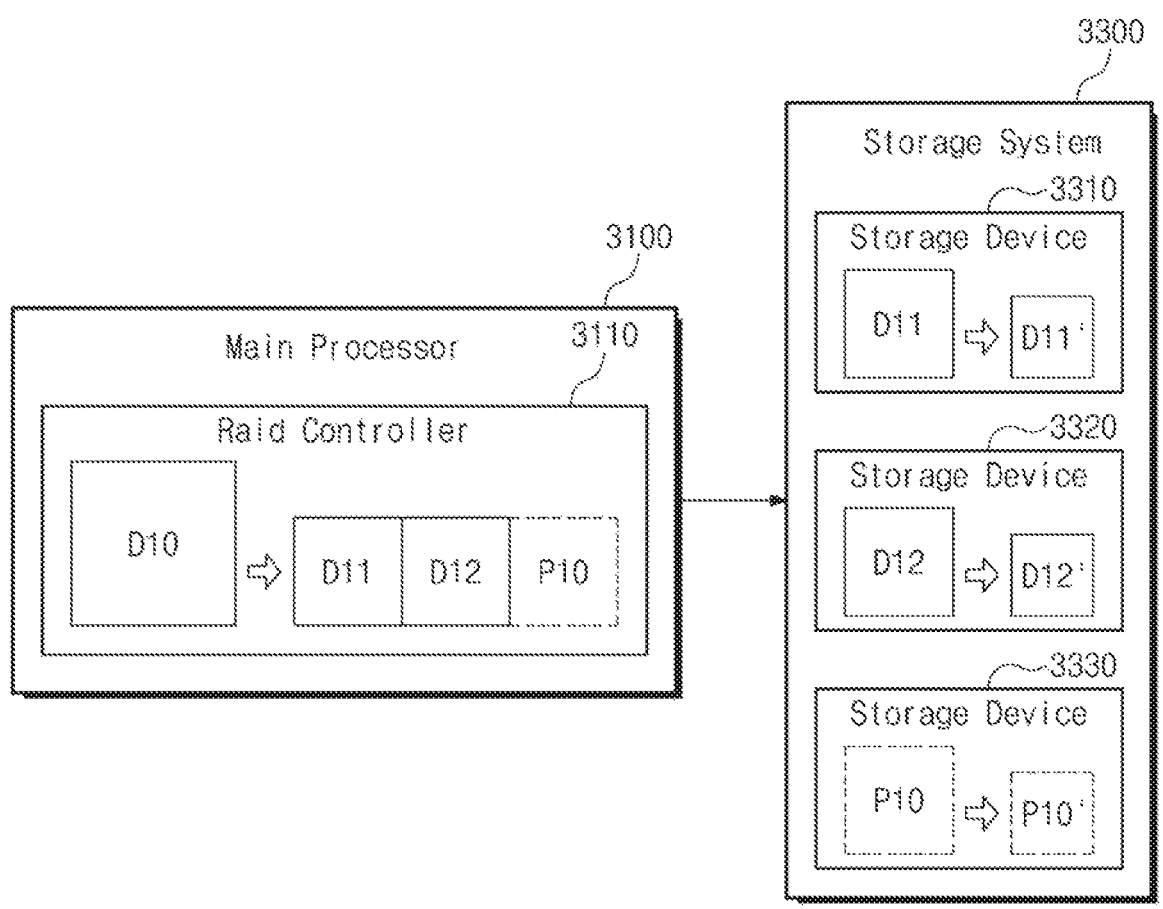
FIG. 13 is a conceptual diagram for describing an RAID scheme in which a storage device performs work associated with data to be stored in a storage system, according to another embodiment.

FIG. 13 is a conceptual diagram for describing an RAID scheme in which a storage device performs work associated with data to be stored in a storage system, according to another embodiment. A main processor 3100 and a storage system 3300 may correspond to the main processor 1100 and the storage system 1300 of FIG. 1, respectively.

The main processor 3100 may include an RAID controller 3110. According to the RAID scheme, data may be managed in units of a stripe. For better understanding, it is assumed that each of data D10 and different data to be described later has a size corresponding to one stripe. However, embodiments are not limited to the assumption. In some embodiments, some data may have a size smaller than one stripe or may have a size corresponding to a plurality of stripes.

One stripe may be divided into a plurality of data chunks. For example, the RAID controller 3110 may divide the data D10 into data chunks D11 and D12. The data chunks D11 and D12 may be greater in size than the data chunks D1 and D2 of FIG. 3. For example, in the case where a size of each of the data chunks D1 and D2 is 128 KB, a size of each of the data chunks D11 and D12 may be an integer multiple of 128 KB. The size of each of the data chunks D11 and D12 may be sufficiently great to such an extent that a size of each of data D11' and the data D12' is an integer multiple of 128 KB.

The RAID controller 3110 may adjust the sizes of the data chunks D11 and D12, based on a type of the storage system 3300 or a situation of the storage system 3300. For example, in a case where a storage space of the storage system 3300 is insufficient, the RAID controller 3110 may divide the data D10 into the data chunks D11 and D12 of relatively smaller sizes. For another example, in a case where a compression ratio in the storage system 3300 is high, the RAID controller 3110 may divide the data D10 into the data chunks D11 and D12 of relatively larger sizes. That a compression ratio in the storage system 3300 is high means that a ratio of the size of the data D11' to the size of the data chunk D11 is low. In a case where a storage space of the storage system 3300 is sufficient, the RAID controller 3110 may divide the data D10 into the data chunks D11 and D12 of relatively larger sizes. In a case where a compression ratio in the storage system 3300 is low, the RAID controller 3110 may divide the data D10 into the data chunks D11 and D12 of relatively smaller sizes. That a compression ratio in the storage system 3300 is low means that a ratio of the size of the data D11' to the size of the data chunk D11 is high.

The RAID controller 3110 may calculate a parity based on the data chunks D11 and D12. The RAID controller 3110 may generate a parity chunk P10 based on the data chunks D11 and D12. A size of the parity chunk P10 may be equal to a size of each of the data chunks D11 and D12.

The RAID controller 3110 may output the data chunks D11 and D12 and the parity chunk P10 to storage devices 3310, 3320, and 3330. In FIGS. 13 to 18, it is assumed that the data chunks D11 and D12 and the parity chunk P10 are respectively output to the storage devices 3310, 3320, and 3330, but embodiments are not limited thereto.

The storage devices 3310, 3320, and 3330 may perform work associated with the data chunks D11 and D12 and the parity chunk P10. In some embodiments, the storage system 3300 may perform work associated with the data chunks D1 and D2 and the parity chunk P10 in response to a request of the main processor 3100. In some embodiments, the request may be the outputting of the data chunks D1 and D2 and parity chunk P10 to the storage system 3300. In other embodiments, the request may be a separate request from the outputting of the data chunks D1 and D2 and parity chunk 3300. For example, the work associated with the data chunks D11 and D12 and the parity chunk P10 may be one of compression, data deduplication, checksum, encryption, etc. The storage devices 3310, 3320, and 3330 may perform the work associated with the data chunks D11 and D12 and the parity chunk P10 to generate data D11', data D12', and a parity P10', respectively.

Memories in the storage devices 3310, 3320, and 3330 may store the data D11', the data D12', and the parity P10' in a minimum size unit. A size of each of the data D11', the data D12', and the parity P10' may be an integer multiple of a minimum size unit.

In the case where a size of data is smaller than the minimum size unit, a storage device may increase the size of the data to the minimum size unit by padding meaningless values such as "0" or "1" to the data for the purpose of storing the data in the memory. In this case, a memory area of storage devices is wasted. Alternatively, a main processor may store all information about irregular sizes of data. In this case, a memory area of the main processor is wasted, and the process of searching the storage devices for data is complicated.

By contrast, the main processor 3100 according to an embodiment may generate the data chunks D11 and D12 and the parity chunk P10 that are sufficiently great to such an extent that a size of each of the data D11', the data D12', and the parity P10' is an integer multiple of the minimum size unit. Accordingly, a memory area of storage devices may not be wasted. Also, a memory area of the main processor 3100 may not be wasted, and the process of searching the storage devices for data may become simple.

Figure 14:
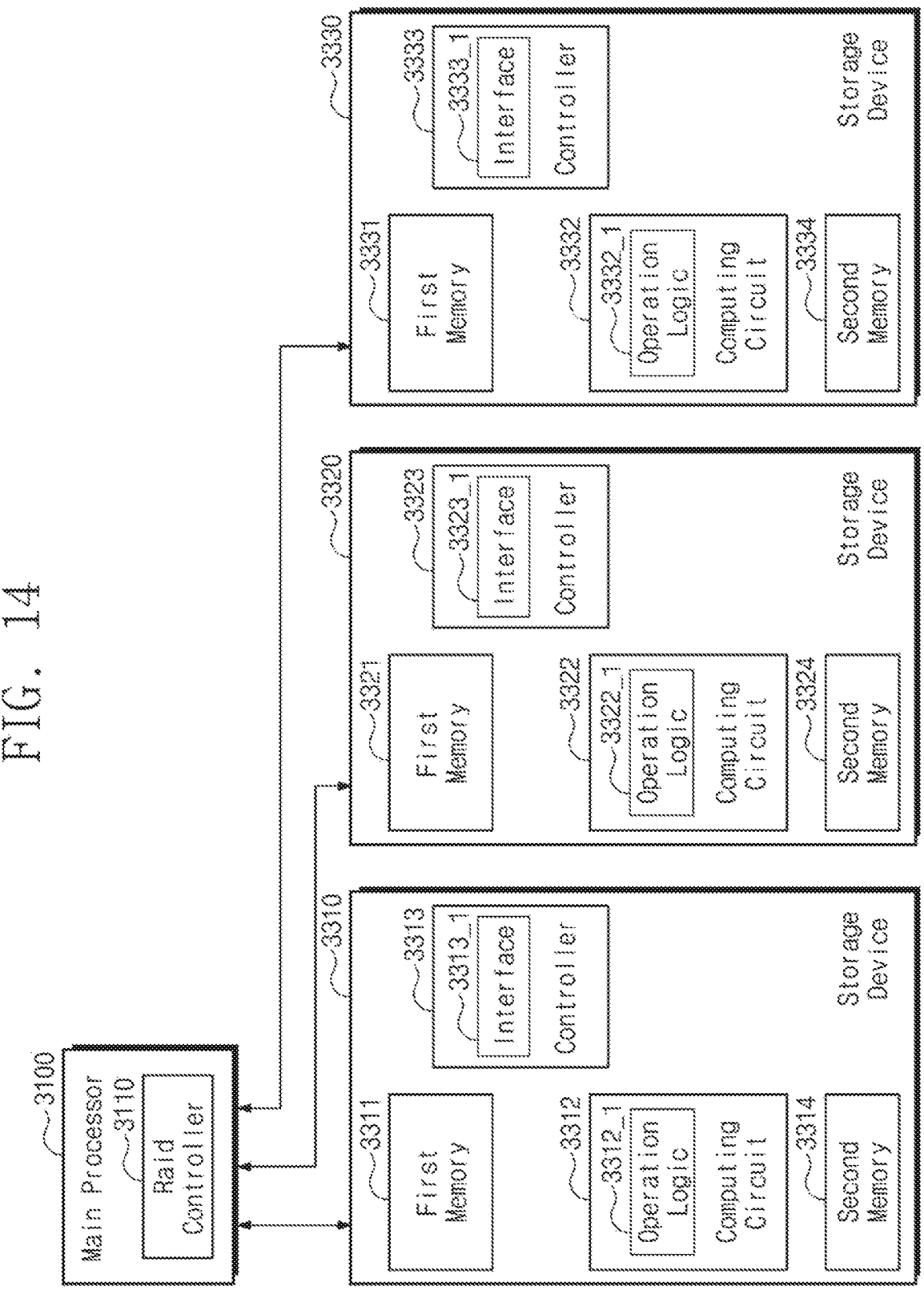
FIG. 14 is a block diagram illustrating configurations of storage devices of the RAID scheme of FIG. 13, according to some embodiments.

FIG. 14 is a block diagram illustrating configurations of storage devices of the RAID scheme of FIG. 13, according to some embodiments.

The main processor 3100 may communicate with the storage devices 3310, 3320, and 3330. The storage devices 3310, 3320, and 3330 may perform the work associated with the data chunks D11 and D12, which are described with reference to FIG. 13, by communicating with the main processor 3100. The storage devices 3310, 3320, and 3330 may store the data D11' and the data D12' without the process of transferring the data D11' and the data D12' of FIG. 14 to the main processor 3100.

Configurations and operations of the storage devices 3320 and 3330 are substantially identical to a configurations and an operation of the storage device 3310, and thus, the configuration and operation of the storage device 3310 will be mainly described with reference to FIG. 14 for conciseness.

The storage device 3310 may include a first memory 3311, a computing circuit 3312, a controller 3313, a second memory 3314, and an internal bus (not illustrated). The components 3311, 3312, 3313, and 3314 in the storage device 3310 may exchange data and signals through the internal bus.

The first memory 3311 may store data to be used for operations of the storage device 3310. The first memory 3311 may temporarily store intermediate results and final results of the operations of the storage device 3310. The first memory 3311 may store the data chunk D11 received from the main processor 3100. The first memory 3311 may be a volatile memory such as a static random access memory (SRAM), a dynamic RAM (DRAM), or a synchronous DRAM (SDRAM). However, embodiments are not limited thereto. For example, the first memory 3311 may be a nonvolatile memory such as a phase-change RAM (PRAM), a magneto-resistive RAM (MRAM), a resistive RAM (ReRAM), or a ferro-electric RAM (FRAM).

The computing circuit 3312 may include operation logic 3312_1. The computing circuit 3312 may respond to a request for storing the data chunk D11, which is received from the main processor 3100, by using the operation logic 3312_1. In response to the request of the main processor 3100, the operation logic 3312_1 may perform work on the data chunk D11 to generate the data D11'. For example, the operation logic 3312_1 may compress the data chunk D11 to generate the data D11'.

The controller 3313 may include an interface 3313_1. The interface 3313_1 may include a physical layer and/or a logical layer configured to transfer/receive and process data, a signal, and/or a packet to allow the controller 3313 to communicate with a component present in the outside of the controller 3313. The interface 3313_1 may include a hardware circuit configured to process communication between the controller 3313 and an external component.

The controller 3313 may communicate with the main processor 3100 by using the interface 3313_1. By using the interface 3313_1, the controller 3313 may receive the data chunk D11 from the main processor 3100 and may transfer size information of the data D11' to the main processor 3100. Later, the main processor 3100 may request the storage device 3310 to read the data D11', based on size information of the data D11'.

The second memory 3314 may store the data D11'. In the case where a read request is received from the main processor 3100, the storage device 3310 may read the data D11' from the second memory 3314. The second memory 3314 may be a nonvolatile memory such as a phase-change RAM (PRAM), a magneto-resistive RAM (MRAM), a resistive RAM (ReRAM), or a ferro-electric RAM (FRAM).

Figure 15:
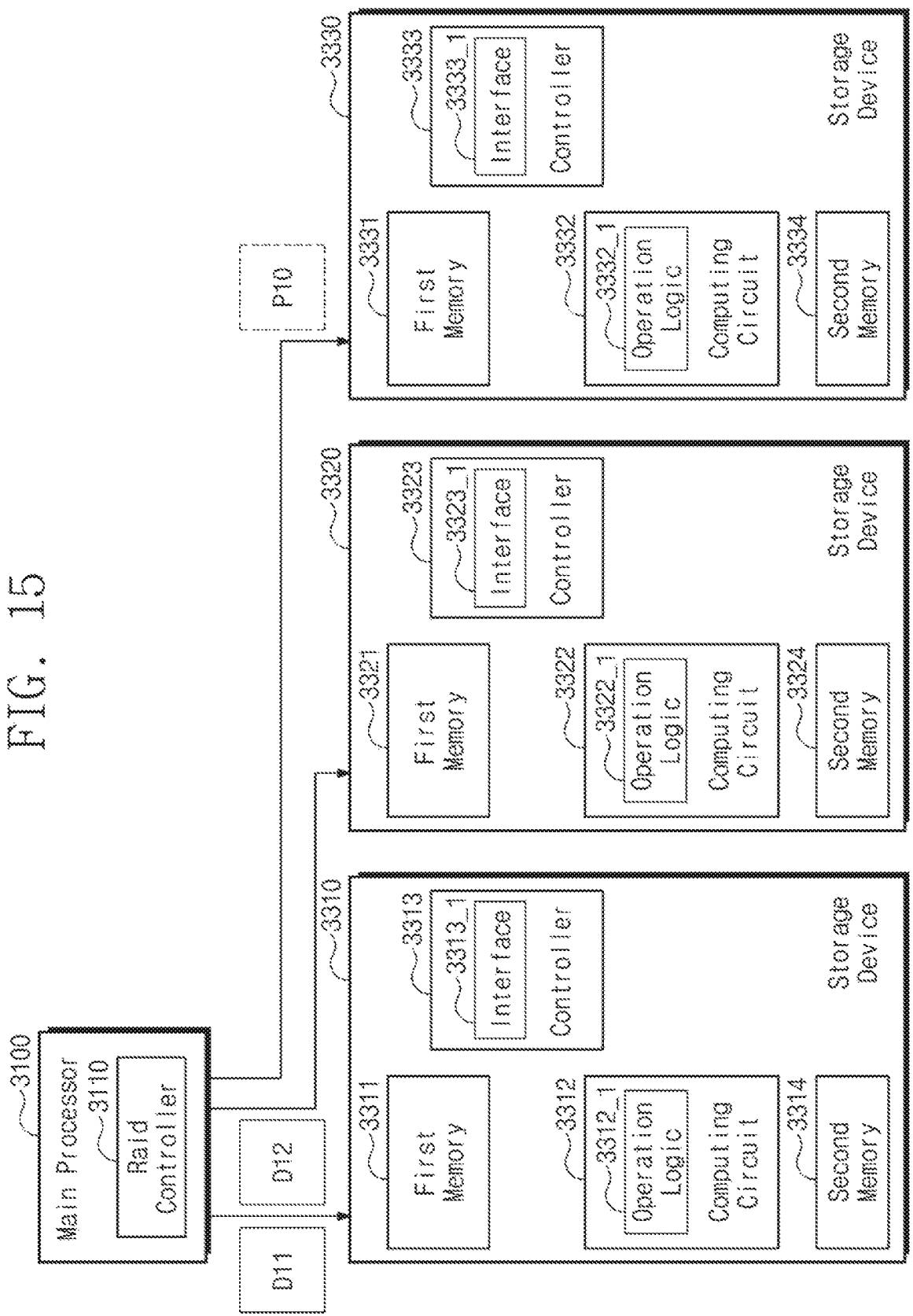
FIGS. 15 to 17 are block diagrams for describing exemplary operations associated with storage devices of the RAID scheme of FIG. 13, according to some embodiments.
Figure 16:
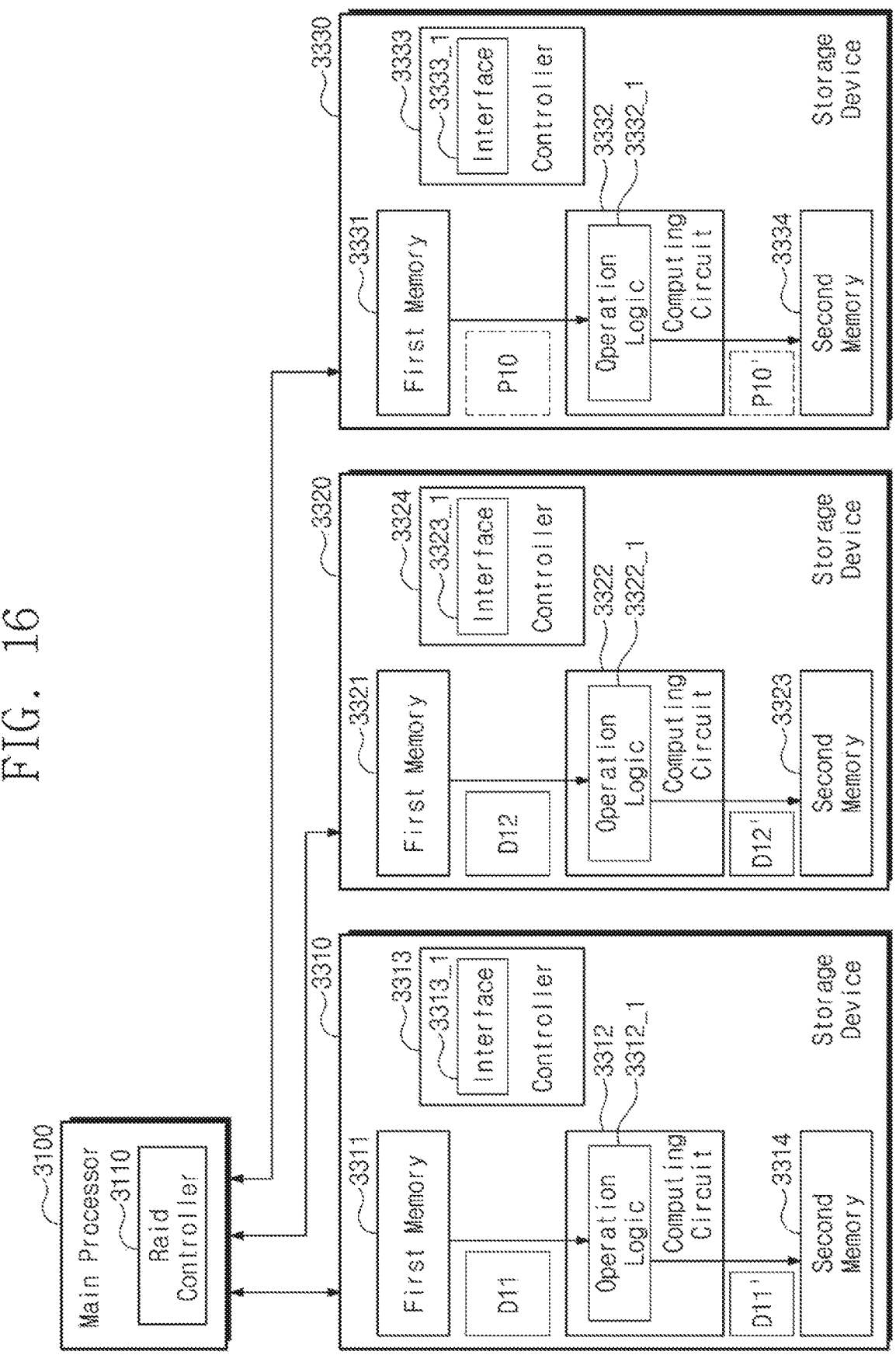
Figure 17:
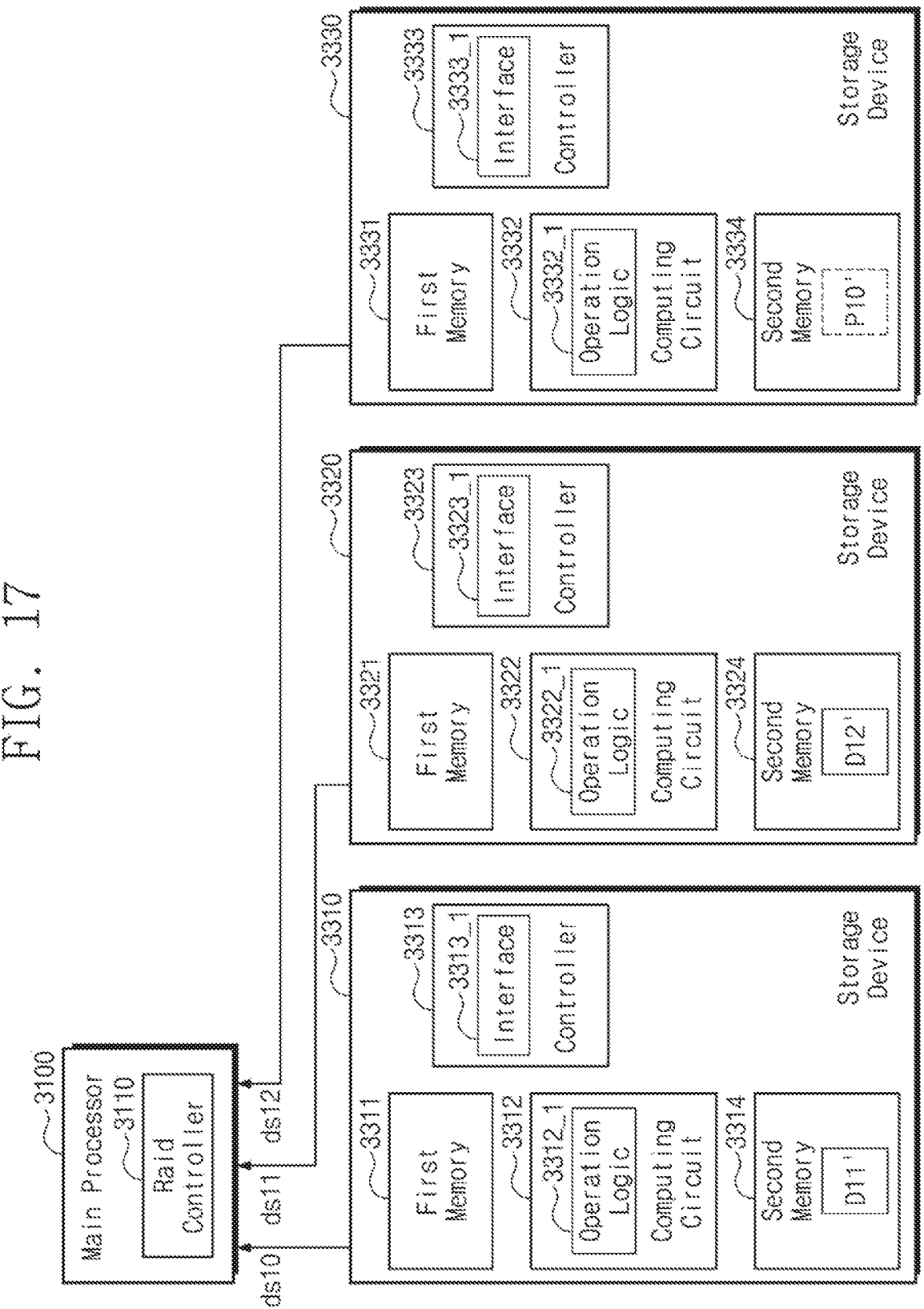

FIGS. 15 to 17 are block diagrams for describing exemplary operations associated with storage devices of the RAID scheme of FIG. 13, according to some embodiments. Exemplary operations of FIGS. 15 to 17 show the process in which the storage devices 3310, 3320, and 3330 perform work associated with the data chunks D11 and D12 and the parity chunk P10 and store the data D11', the data D12', and the parity P10' without the process of transferring the data D11' and the data D12' to the main processor 3100.

Referring to FIG. 15, the main processor 3100 may output the data chunks D11 and D12 and the parity chunk P10 to the storage devices 3310, 3320, and 3330, respectively. The storage devices 3310, 3320, and 3330 may receive the data chunks D11 and D12 and the parity chunk P10 through the interfaces 3313_1, 3323_1, and 3333_1, respectively. The first memories 3311, 3321, and 3331 may store the data chunks D11 and D12 and the parity chunk P10, respectively. In the following description, it is assumed that the data chunks D11 and D12 and the parity chunk P10 are transferred to the storage devices 3310, 3320, and 3330, but embodiments are not limited thereto.

Referring to FIG. 16, the operation logics 3312_1, 3322_1, and 3332_1 may receive the data chunks D11 and D12 and the parity chunk P10 from the first memories 3311, 3321, and 3331, respectively. The operation logics 3312_1, 3322_1, and 3332_1 may perform work associated with the data chunks D11 and D12 and the parity chunk P10, which is requested from the main processor 3100. In the following description, it is assumed that the work requested from the main processor 3100 is compression, but embodiments are not limited thereto. The work requested from the main processor 3100 may be work, which is performed on the data chunks D11 and D12 and the parity chunk P10 for the purpose of generating the data D11', the data D12', and the parity P10' to be stored in the storage devices 3310, 3320, and 3330, such as compression, data deduplication, checksum, or encryption. The operation logics 3312_1, 3322_1, and 3332_1 may compress the data chunks D11 and D12 and the parity chunk P10 to generate the data D11', the data D12', and the parity P10', respectively.

Referring to FIG. 17, the operation logics 3312_1, 3322_1, and 3332_1 may generate signals ds10, ds11, and ds12, based on the data D11', the data D12', and the parity P10', respectively. The signals ds10, ds11, and ds12 may indicate sizes of the data D11', the data D12', and the parity P10', respectively. The storage devices 3310, 3320, and 3330 may output the signals ds10, ds11, and ds12 to the main processor 3100 through the interfaces 3313_1, 3323_1, and 3333_1, respectively.

The main processor 3100 may receive the signals ds10, ds11, and ds12. The main processor 3100 may store information about the sizes of the data D11', the data D12', and the parity P10', based on the signals ds10, ds11, and ds12. Later, the main processor 3100 may read or search for the data D11' or the data D12' based on the information about the sizes of the data D11', the data D12', and the parity P10'.

Figure 18:
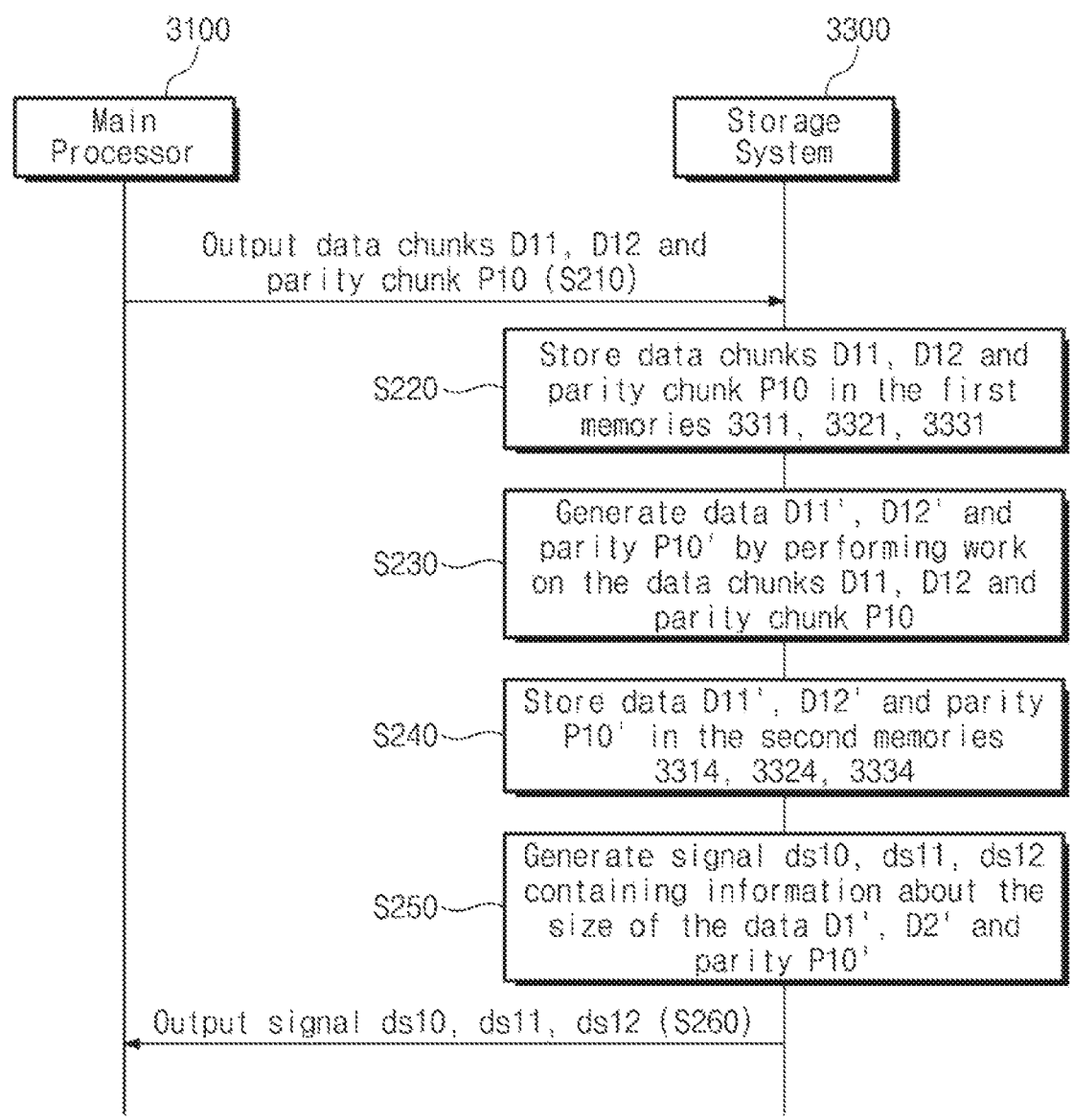
FIG. 18 is a flowchart for describing operations of a main processor and a storage system of the RAID scheme of FIG. 13, according to some embodiments.

FIG. 18 is a flowchart for describing operations of a main processor and a storage system of the RAID scheme of FIG. 13, according to some embodiments.

In operation S210, the main processor 3100 may output the data chunks Dli and D12 and the parity chunk P10 to the storage system 3300.

In operation S220, the storage system 3300 may store the data chunks Dli and D12 and the parity chunk P10 received from the main processor 3100 in the first memories 3311, 3321, and 3331, respectively.

In operation S230, the storage system 3300 may perform work associated with the data chunks D11 and D12 and the parity chunk P10 in response to a request of the main processor 3100. In some embodiments, the storage system 3300 may perform work associated with the data chunks D1 and D2 and the parity chunk P10 in response to a request of the main processor 3100. In some embodiments, the request may be the outputting of the data chunks D1 and D2 and parity chunk P10 to the storage system 3300 in operation S210. In other embodiments, the request may be a separate request from the outputting of the data chunks D1 and D2 and parity chunk 3300. The storage system 3300 may perform the work associated with the data chunks D11 and D12 and the parity chunk P10 to generate the data D11', the data D12', and the parity P10', respectively.

In operation S240, the storage system 3300 may store the data D11', the data D12', and the parity P10' in the second memories 3314, 3324, and 3334, respectively.

In operation S250, the storage system 3300 may generate the signals ds10, ds11, and ds12 based on the data D11', the data D12', and the parity P10', respectively. The signals ds10, ds11, and ds12 may indicate sizes of the data D11', the data D12', and the parity P10', respectively.

In operation S260, the storage system 3300 may output the signals ds10, ds11, and ds12 to the main processor 3100. Later, the main processor 3100 may read or search for the data D11' or the data D12' based on the signals ds10, ds11, and ds12.

According to various embodiments, work associated with data to be stored in a storage device may be performed within the storage device, not a host device. Accordingly, the workload of the host device may be decreased.

Also, since the storage device may perform peer-to-peer communication with a different storage devices, the storage device may transfer processed data to the different storage devices without the process of transferring the processed data to the host device. Accordingly, the amount of information exchanged between the host device and the storage device and/or the number of times of communication between the host device and the storage device may be decreased.

While various exemplary embodiments have been described, it will be apparent to those of ordinary skill in the art that various changes and modifications may be made thereto without departing from the spirit and scope of the present disclosure as set forth in the following claims.

What is claimed is:

1. A storage device comprising:
   a first interface configured to receive a first data chunk from a host device;

an operation circuit configured to generate first processed data by processing the first data chunk and to generate a first signal indicating a size of the first processed data; and a nonvolatile memory configured to store the first processed data in a storage location, when the storage location at which the first processed data are to be stored is designated by the host device to the storage device based on the first signal, wherein the first interface is configured to output the first signal to the host device.

2. The storage device of claim 1, wherein the first interface receives a second signal from the host device, wherein the storage device further comprises a second interface, wherein, when the second signal indicates an another storage device that is external to the storage device as the storage location, the second interface outputs the first processed data to the another storage device, and wherein the storage location is based on the first signal.

3. The storage device of claim 1, wherein the processing includes compression, data deduplication, checksum, or encryption.

4. The storage device of claim 2, wherein the second signal indicates a generation location at which a parity is to be generated, wherein, when the storage device is designated as the generation location, the second interface is configured to receive second processed data from the another storage device that is external to the storage device; and wherein the storage device further comprises a parity generator configured to generate the parity for recovering the first processed data and the second processed data, based on the first processed data and the second processed data.

5. The storage device of claim 4, wherein, when the parity is generated by the parity generator, the nonvolatile memory stores the parity.

6. The storage device of claim 2, wherein the second signal indicates a generation location at which a parity is to be generated, and wherein, when the another storage device that is external to the storage device is designated as the generation location, the second interface outputs the first processed data to the another storage device.

7. The storage device of claim 1, further comprising:
a volatile memory configured to store the first data chunk.

8. A storage system comprising:
a first storage device configured to receive a first data chunk from a host device, to convert the first data chunk into first data, and to output a first signal indicating a size of the first data to the host device; and a second storage device configured to receive a second signal from the host device after the first signal is output, wherein, when the second signal indicates the second storage device as a generation location at which a parity for recovering the first data is to be generated, the second storage device is configured to receive the first data from the first storage device and generate the parity based on the first data.

9. The storage system of claim 8, wherein the second storage device includes:

a first interface configured to receive the second signal from the host device; and a second interface configured to receive the first data from the first storage device.

10. The storage system of claim 8, wherein the second storage device includes:

a first memory configured to store the first data; and
a second memory configured to store the parity.

11. The storage system of claim 10, wherein the first memory is a volatile memory, and wherein the second memory is a nonvolatile memory.

12. The storage system of claim 8, further comprising:
a third storage device configured to receive a second data chunk from the host device, to convert the second data chunk into second data, and to output a third signal indicating a size of the second data to the host device, wherein, when the second signal is received, the second storage device receives the second data from the third storage device and generates the parity based on the first data and the second data.

13. The storage system of claim 8, wherein the first storage device includes a nonvolatile memory, and the first storage device receives a third signal from the host device after outputting the first signal, and wherein, when the third signal indicates the first storage device as a storage location where the first data are to be stored, the first storage device stores the first data in the nonvolatile memory.

14. The storage system of claim 8, wherein the second storage device includes a nonvolatile memory, and wherein, when the second signal indicates the second storage device as a storage location at which the first data are to be stored, the second storage device receives the first data from the first storage device and stores the first data in the nonvolatile memory.

15. The storage system of claim 8, wherein the second signal is a signal generated based on the first signal.

16. A storage system comprising:
a first storage device configured to receive a first data chunk from a host device, to generate first processed data by processing the first data chunk, to generate a signal indicating a size of the first processed data, and to output the signal to the host device; and a second storage device configured to receive a first parity chunk for recovering the first data chunk and to generate a first processed parity data by processing the first parity chunk, wherein the first storage device includes a first memory configured to store the first processed data in a first size unit, and wherein the size of the first processed data is an integer multiple of the first size unit.

17. The storage system of claim 16, wherein the first storage device further includes a second memory configured to store the first data chunk.

18. The storage system of claim 17, wherein the first memory is a nonvolatile memory, and wherein the second memory is a volatile memory.

19. The storage system of claim 16, wherein a size of the first data chunk is inversely proportional to a ratio of the size of the first processed data to the size of the first data chunk.

* * * * *